US011942100B1

(12) United States Patent
Joshi et al.

(10) Patent No.: US 11,942,100 B1
(45) Date of Patent: Mar. 26, 2024

(54) ENCODING AUDIO METADATA IN AN AUDIO FRAME

(71) Applicant: Amazon Technologies, Inc., Seattle, WA (US)

(72) Inventors: Aditya Sharadchandra Joshi, Sunnyvale, CA (US); Carlo Murgia, Santa Clara, CA (US); Michael Thomas Peterson, Watertown, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/713,084

(22) Filed: Apr. 4, 2022

Related U.S. Application Data

(63) Continuation of application No. 16/995,220, filed on Aug. 17, 2020, now Pat. No. 11,315,581.

(51) Int. Cl.
*G10L 19/02* (2013.01)
*G06F 3/16* (2006.01)
*G10L 19/002* (2013.01)
*G10L 21/02* (2013.01)
*H04L 65/70* (2022.01)
*H04L 65/75* (2022.01)

(52) U.S. Cl.
CPC ............... *G10L 19/02* (2013.01); *G06F 3/16* (2013.01); *G06F 3/165* (2013.01); *G10L 19/002* (2013.01); *G10L 21/02* (2013.01); *H04L 65/70* (2022.05); *H04L 65/75* (2022.05)

(58) Field of Classification Search
CPC .............................. G10L 19/02; G10L 19/002
See application file for complete search history.

(56) References Cited

U.S. PATENT DOCUMENTS

| | | | |
|---|---|---|---|
| 9,548,053 B1 * | 1/2017 | Basye | ...................... G10L 15/22 |
| 2004/0001611 A1 | 1/2004 | Celik et al. | |
| 2014/0164516 A1 * | 6/2014 | Maltbie | .................. H04L 67/108 |
| | | | 709/204 |
| 2014/0270338 A1 * | 9/2014 | Zhao | ...................... G06T 1/0028 |
| | | | 382/100 |
| 2015/0325243 A1 | 11/2015 | Grant et al. | |
| 2015/0348558 A1 | 12/2015 | Riedmiller et al. | |
| 2015/0371637 A1 * | 12/2015 | Neubacher | ........... G11B 27/031 |
| | | | 704/235 |

(Continued)

OTHER PUBLICATIONS

U.S. Appl. No. 16/995,220, "Non-Final Office Action," dated Aug. 25, 2021, 14 pages.

(Continued)

*Primary Examiner* — Bryan S Blankenagel
(74) *Attorney, Agent, or Firm* — Kilpatrick Townsend & Stockton LLP

(57) ABSTRACT

Techniques for encoding audio data with metadata are described. In an example, a device receives audio data corresponding to audio detected by a microphone and receives metadata associated with the audio. The device generates encoded data based at least in part on encoding the audio data with the metadata. The encoding involves replacing a portion of the audio data with the metadata, such that the encoded data includes the metadata and a remaining portion of the audio data. The device sends the encoded data to an audio processing application.

20 Claims, 15 Drawing Sheets

(56) References Cited

U.S. PATENT DOCUMENTS

| | | | |
|---|---|---|---|
| 2016/0029138 A1 | 1/2016 | France et al. | |
| 2017/0048564 A1* | 2/2017 | Roujansky | H04N 19/177 |
| 2018/0210842 A1* | 7/2018 | Nuzman | G06F 12/1027 |
| 2018/0302662 A1* | 10/2018 | So | H04N 21/434 |
| 2019/0058929 A1* | 2/2019 | Young | H04N 21/235 |
| 2019/0080700 A1* | 3/2019 | Schug | G10L 19/002 |
| 2020/0265859 A1 | 8/2020 | Labosco et al. | |
| 2021/0375297 A1 | 12/2021 | Bruhn et al. | |

OTHER PUBLICATIONS

U.S. Appl. No. 16/995,220, "Notice of Allowance," dated Jan. 5, 2022, 8 pages.

\* cited by examiner

ENCODING AUDIO METADATA IN AN AUDIO FRAME

CROSS-REFERENCE TO RELATED APPLICATION

This application claims priority to and is a continuation of U.S. patent application Ser. No. 16/995,220, filed Aug. 17, 2020, entitled "ENCODING AUDIO METADATA IN AN AUDIO FRAME," the content of which is hereby incorporated by reference in its entirety for all purposes.

BACKGROUND

As voice recognition technology improves, systems that employ such technology continue to proliferate. Some systems employ what is referred to as near-field voice recognition where a user speaks into a microphone located on a handheld device, such as a remote control or mobile device. Other systems employ far-field voice recognition where a user can speak to a device while the user is within the general vicinity of the device, e.g., within the same room, but not necessarily in close proximity to or even facing the device. Both far-field devices and near-field devices can be used for audio communications with other devices.

BRIEF DESCRIPTION OF THE DRAWINGS

Various embodiments in accordance with the present disclosure will be described with reference to the drawings, in which.

DETAILED DESCRIPTION

Figure 1:
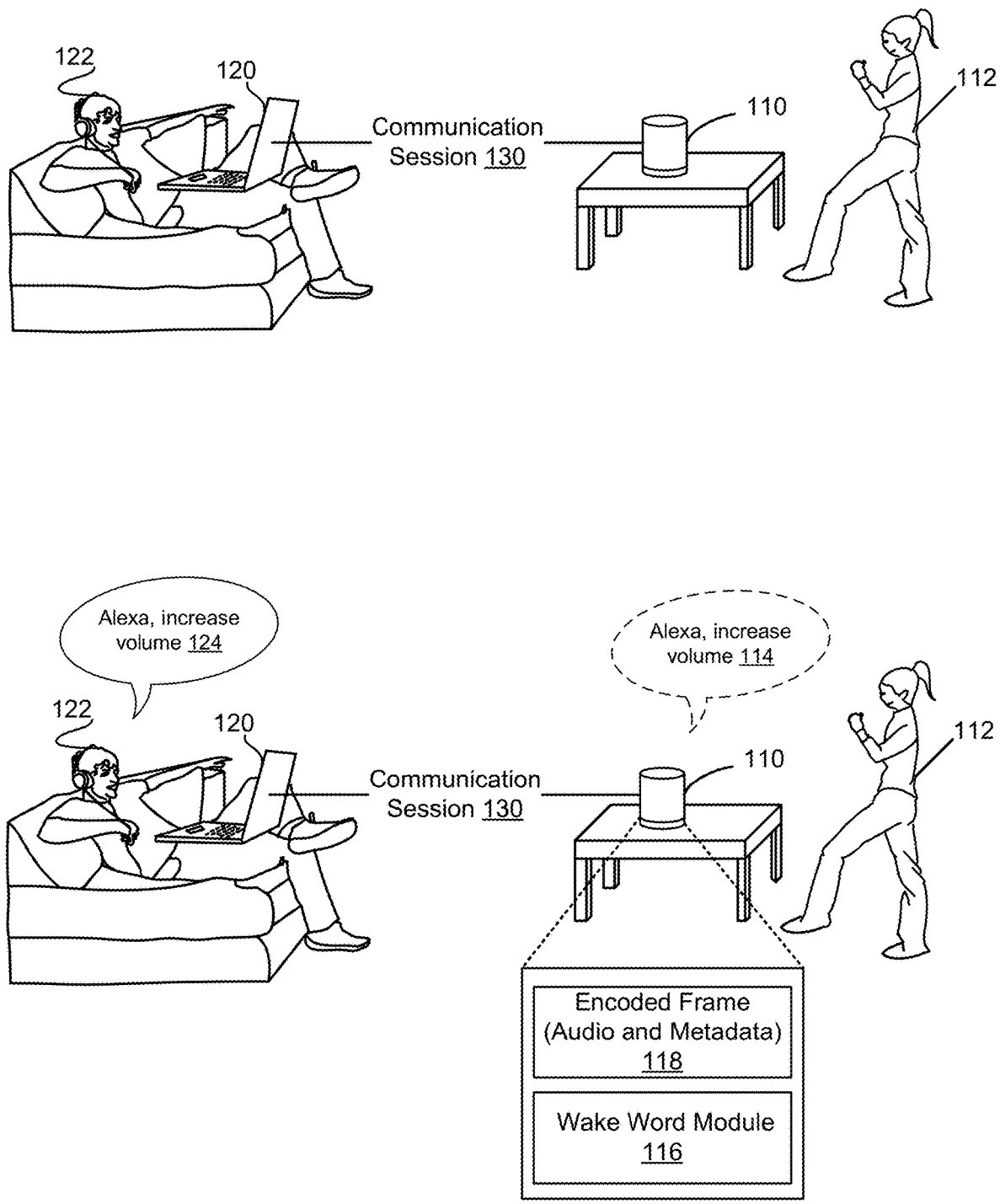
FIG. 1 illustrates an example of using encoded frames by a device in support of an audio processing application, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, encoding audio data with metadata to improve the synchronization of the audio data and metadata without a significant loss to the audio quality. In an example, a device receives audio data that corresponds to audio detected by a microphone. The device also receives metadata associated with the audio data, such as metadata indicating a property of the audio (e.g., whether the audio corresponds to a near end speech input or a far end speech input, the signal to noise ratio (SNR) of the audio, whether the audio includes ambient noise only or sound instead, a timestamp of when the audio data was generated, and the like). Near end speech input corresponds to an audio signal that is detected by a microphone of the device and that originates from a source (e.g., a person) near the device (e.g., in the same location that contains the device). In comparison, far end speech input corresponds to an audio signal that originated from a source that is not near the device (e.g., a person in a different location), received by the device as audio data, output via a speaker of the device, reflected from another source near the device (e.g., from a wall), and detected by the microphone of the device upon being reflected. Encoded data is generated by encoding the audio data with the metadata. In particular, the device replaces a portion of the audio data with the metadata, such that the encoded data includes the metadata and a remaining portion of the audio data. The encoded data is sent to an audio processing application. Upon decoding of the encoded data, the metadata and the remaining portion of the audio data are extracted. Depending on the metadata (e.g., on the property indicated therein), the audio processing application performs an operation on the remaining portion of the audio data (e.g., suppresses this audio data upon an indication of being a far end speech input, stops additional audio processing if the SNR is relatively low, transitions the device to a low power mode when the audio includes ambient noise only, determines an audio processing latency, and the like). In this way, the metadata and the audio data are contained in the same frame throughout the processing lifecycle, thereby avoiding the need for time-based or other types of synchronization. In addition, only a small portion of the audio data is removed from the encoding, thereby minimizing the loss to the audio quality such that the loss is not noticeable to a user.

To illustrate, consider an example of a smart speaker that responds to a specific wake word (e.g., "Alexa"). During a call communication session between the smart speaker and a second device, speech input is sent from the second device and includes the wake word (e.g., "Alexa, increase the volume"). The smart speaker outputs this speech input on its local speaker. Due to acoustic wave reflection from an object in the vicinity of the smart speaker, the smart speaker's microphone detects corresponding audio that also includes the wake word (e.g., "Alexa, increase the volume"). The wake word can be detected and the audio corresponding to the wake word can be suppressed by determining that this audio is from a far end source. To do so, an audio front end of the smart speaker performs acoustic echo cancellation (AEC) and generates a metadata frame indicating that the audio frame that captures the wake word includes far end audio data. The audio front end generates an encoded frame by replacing least significant bits in audio samples of the audio frame with metadata bits of the metadata frame. The encoded frame is sent to a wake word detection application of the smart speaker. The encoded frame is decoded, and the metadata bits and the audio bits are extracted. The wake word application determines that the metadata bits indicate the far end nature of the audio bits. Accordingly, the audio bits need not be processed and can be ignored, thereby suppressing the wake word.

Embodiments of the present disclosure provide various technological advantages over a conventional audio processing system. The conventional audio system can generate and process audio data and related metadata. However, these two pieces of information are not contained in the same data frame structure. Hence, additional processing is needed to synchronize the audio data and related metadata. In comparison, the embodiments allow the audio data to be encoded with the metadata, such that the two pieces of data can be contained in the same data frame structure and, therefore, avoid the need for additional synchronization processing. In addition, the embodiments minimize the amount of audio information that is replaced in the encoding process, such that the loss to the audio quality is minimal. For instance, at a sixteen kHz sampling rate and a frame length of eight milliseconds per audio frame, one-hundred twenty-eight audio samples are available and can each have a sixteen bit resolution. One least significant bit per audio sample can be replaced with one metadata bit, thereby allowing encoding of one-hundred twenty-eight bits of metadata in the eight milliseconds audio frame. The quantization noise from this encoding process is about −90 dB, which is typically in the noise floor.

FIG. 1 illustrates an example of using encoded frames by a device 110 in support of an audio processing application, according to embodiments of the present disclosure. As illustrated, the device 110 is operable by a user 112 and processes audio. The processing relies on the encoded frames, where each encoded frame includes audio data and metadata associated with the audio data. Upon decoding of an encoded frame, the metadata and the audio data encoded therein are determined and an audio processing application performs an operation on the audio data depending on the metadata.

In an example, the device 110 represents a computing device that is capable of supporting various computing services including, for instance, audio processing operations. In particular, the device 110 includes one or more processors, one or more memories storing computer-readable instructions, one or more audio processing systems, one or more network interfaces, one or more microphones, one or more speakers, and/or other computing components. Audio can be detected by a microphone and can be processed by an audio processing system to generate audio frames and metadata frames and to include the metadata frames in the audio frames. Encoded frames can also be processed to extract the encoded audio data and metadata for use by one or more audio processing applications. In an illustration, the device 110 can be any of a smart speaker, a multimedia device, a smart home device, an Internet of Things (IoT) device, or any other type of suitable computing device.

In the illustration of FIG. 1, the device 110 is responsive to a wake word (e.g., "Alexa") and can be controlled by the user 112 based on speech input of this user 112. For instance, upon an utterance that includes a wake word and a command (e.g., "Alexa, call my contact John Smith"), the device 110 detects the wake word and performs the command (e.g., determines a device 120 of a contact 122 and establishes a communication session 130 with this device 120 corresponding). Subsequent speech input by the user 112 that does not include the wake word is sent as audio data to the other device 120. Similarly, speech input of the contact 122 is received by the device 110 from the other device 120 as audio data.

At some point during the communication session 130, the contact 122 may provide speech input 124 at the device 120, where this speech input 124 includes the wake word (shown as "Alexa, increase the volume"). The device 120 sends the corresponding audio data to the device 110 that, in turn, outputs it at a local speaker. Due to acoustic waveform reflection, the device's 110 microphone detects corresponding audio 114 (shown with a dashed call out that includes "Alexa, increase the volume").

In this case, the device 110 can also detect the wake word and, if the wake word is not suppressed, further detect and process the remainder of the audio (e.g. "increase the volume), and perform a command (e.g., increase the volume of the local speaker). However, such an outcome is undesirable because it allows the contact 122 to remotely perform the command. Instead, the device 110 includes a wake word module 116 that processes audio data corresponding to the wake word (e.g., to detect the wake word) and metadata about the audio data (e.g., whether the audio data is from a near end source or a far end source). Here, the metadata indicates that the audio data is from a far end source and the wake word module 116 suppresses the wake word, such that the wake word can be ignored and the remainder of the audio need not be detected.

In an example, the wake word is detected by the microphone of the device 110, where the microphone generates the corresponding audio data. Depending on a sampling rate and a frame length, the audio data can be contained in one or more audio frames. Each audio frame includes a number of audio samples and each audio sample includes a number of audio bits. Similarly, the metadata can be generated by an audio processing system of the device 110 and can be contained in one or more metadata frames. Each metadata frame includes metadata bits and indicates a property of the audio data (e.g., whether the audio data is from a near end source or a far end source).

The device 110 (e.g., the audio processing system) can encode a metadata frame in a corresponding audio frame, resulting in an encoded frame 118. As further described in the next figures, the encoding involves replacing a portion of the audio bits with metadata bits. The encoded frame 118 can be sent to the wake word module 116, and/or any other audio processing module, that then decodes it to extract the metadata bits, determine the indicated property, and perform an audio processing operation on the audio bits (e.g., suppress the audio bits upon the property indicating a far end source; otherwise, detect the wake word).

Wake word suppression is one example use case. Embodiments of the present disclosure are not limited to this use case and similarly apply to other audio processing operations. For example, metadata can be encoded with audio data to indicate any property of the audio data, such as an SNR, a timestamp, a presence of sound, and the like. The encoded data can be sent to an audio processing application. Upon extracting the metadata, the audio processing application determines the property and, as applicable depending on the property, extracts the audio data and performs an operation on the audio data (e.g., suppresses audio that has low SNR, determines an audio processing latency, detects a sound and indicates that the device 110 is to operate in a high power mode, and the like).

Figure 2:
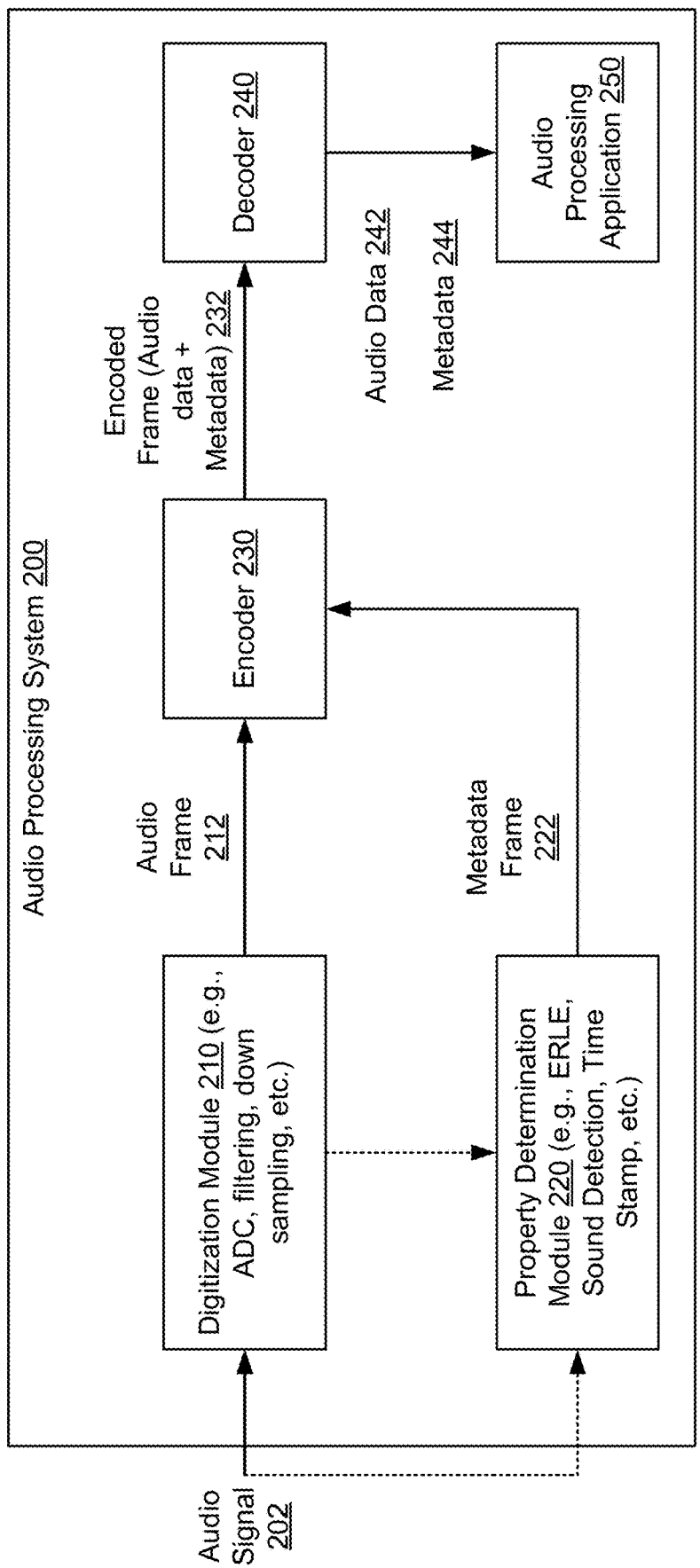
FIG. 2 illustrates an example of components of a device capable of processing encoded frames, according to embodiments of the present disclosure.

FIG. 2 illustrates an example of components of a device capable of processing encoded frames, according to embodiments of the present disclosure. The device, such as the device 110 of FIG. 1, includes at least one audio processing system 200. Generally, the audio processing system 200 supports a number of audio processing operations including, for instance, encoding audio data with metadata and extracting encoded metadata and encoded audio data.

In an example, the audio processing system 200 includes a digitization module 210, a property determination module 220, an encoder 230, a decoder 240, and an audio processing application 250. Each of these computing components is described herein next and can be implemented by using dedicated hardware and/or computer-readable instructions executable on a general purpose processor.

The digitization module 210 receives an audio signal 202, such as an analog signal generated by an analog microphone upon a detection of audio by a microphone, or a digital signal generated by a digital microphone upon such a detection. In the case of an analog signal, the digitization module 210 can include an analog-to-digital converter (ADC) that generates a digital signal from the analog signal. In both cases, the digitalization module 210 includes other audio processing components that can process digital signals, such as filters (e.g., a high pass filter), a down sampler, and the like. The digitization module 210 outputs audio data (e.g., digital representation of the audio signal 202). In an example, the audio data is contained in audio frames. An audio frame 212 has a frame length (e.g., eight milliseconds) and includes a number of audio samples depending on a sampling rate (e.g., one-hundred twenty eight audio samples in the case of a sixteen kHz sampling rate). Each audio sample has a bit resolution (e.g., includes sixteen bits).

Upon receiving one or both of the audio signal 202 and the audio frames output by the digitization module 210 (as illustrated with the two dotted arrows), the property determination module 220 determines one or more properties of the audio detected by the microphone. A property includes any of an echo return loss enhancement indicating whether the audio is from a near end source or a far end source, an SNR, a presence of sound, a timestamp of when the audio signal 202 was received, and the like. The property determination module 220 outputs the one or more properties and, optionally, measurements that the property determination module 220 used to determine the property (e.g., echo return loss enhancement raw data). In an example, the property and the measurements can be output as metadata that is contained in metadata frames. A metadata frame 222 includes metadata bits that form, for instance, a header, a version type of the metadata frame 222, and a payload.

The encoder 230 receives audio data from the digitization module 210 and metadata from the property determination module 220 and generates encoded data by encoding the audio data with the metadata. The encoding involves, for instance, replacing a portion of the audio data with the metadata. In an example, the encoder 230 receives the audio frame 212 and the metadata frame 222 that are generated from a same sample of the audio signal 202 (e.g., from eight milliseconds of the audio signal 202). In an example, the encoder 230 generates an encoded frame 232 by encoding the metadata frame 222 in the audio frame 212. In particular, the encoder 230 replaces one or more audio bits in at least a subset of the audio samples of the audio frame 212 with metadata bits of the metadata frame 222 (e.g., for a metadata frame 222 that is thirty-three bits long, the encoder 230 replaces the least significant bit in each of the first thirty-tree audio samples with a different bit of the thirty-three metadata bits). The resulting encoded frame 232 encodes both audio data and metadata.

The decoder 240 receives and decodes the encoded data from the encoder 230 to extract audio data 242 and metadata 244 encoded therein. For example, the decoder 240 receives the encoded frame 232 and extracts the least significant bits. By matching a first subset of the least significant bits with a known metadata header, the decoder 240 determines that the encoded frame 232 includes encoded metadata. Next, the decoder 240 matches a second subset of the least significant bits with a known version type and determines the length of the payload that corresponds to this version type. Accordingly, the decoder 240 determines a third subset of the least significant bits having a size equal to the length and sets this subset as the payload. The payload, version type, and header form the metadata 244. Remaining bits of the encoded frames are audio bits that correspond to the audio data 242.

The audio processing application 250 receives the audio data 242 and the metadata 244 and performs an operation on the audio data 242 depending on the metadata 244. For example, the audio processing application 250 determines the property from the metadata 244 and performs the applicable operation given the property.

Although FIG. 2 illustrates the different components as being included in a single audio processing system, the embodiments of the present disclosure are not limited as such. For instance, the digitization module 210, the property determination module 220, and the encoder 230 can be components of a first audio processing system (e.g., an audio front end system), whereas the decoder 240 and the audio processing application 250 can be components of a second audio processing system (e.g., a client system of the audio front end system).

Figure 3:
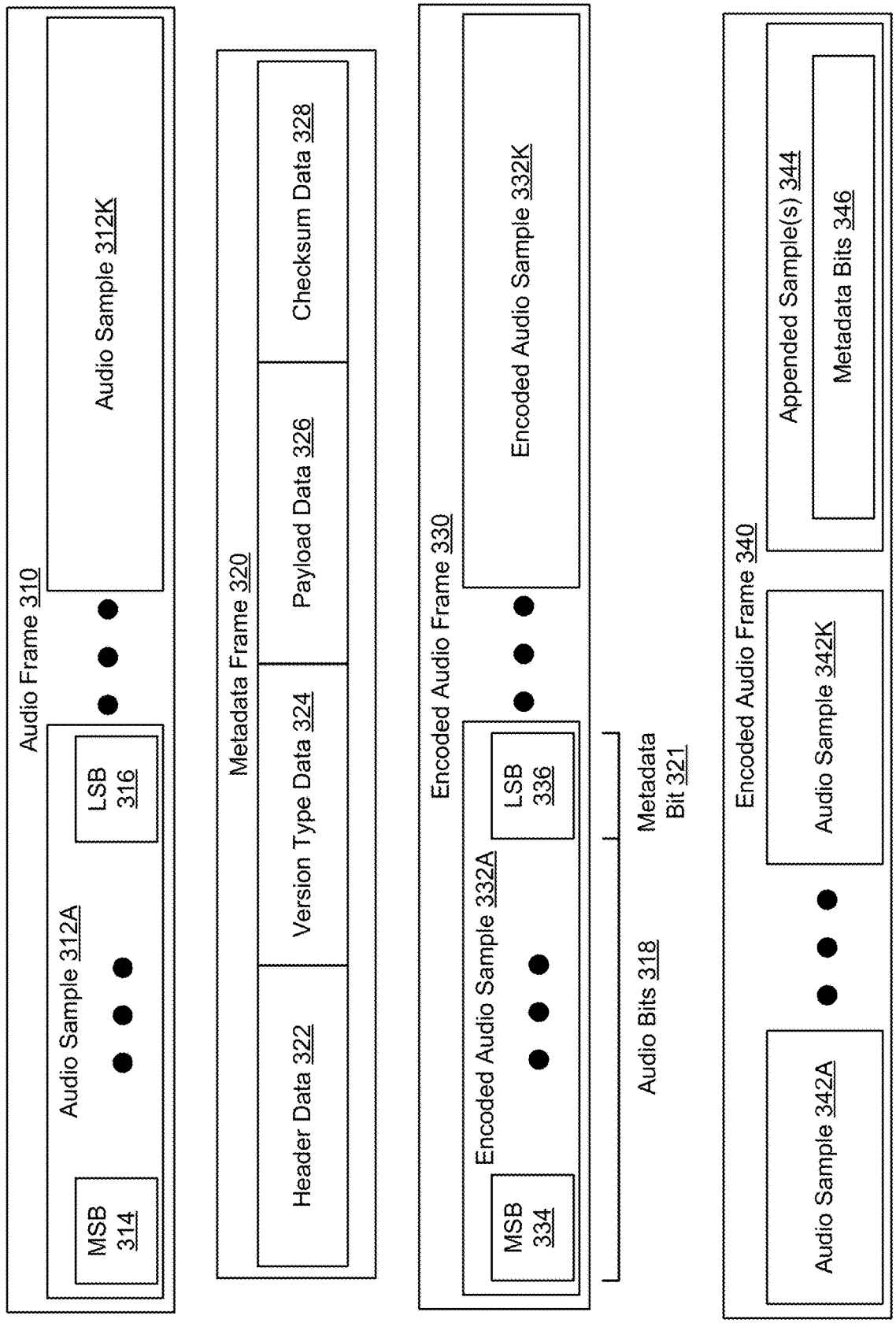
FIG. 3 illustrates an example of an audio frame, a metadata frame, and an encoded frame that encodes the metadata frame in the audio frame, according to embodiments of the present disclosure.

FIG. 3 illustrates an example of an audio frame 310, a metadata frame 320, an encoded audio frame 330 that encodes the metadata frame 320 in the audio frame 310, and an encoded audio frame 340 that also encodes the metadata frame 320 in the audio frame 310 according to embodiments of the present disclosure. The audio frame 310 and the metadata frame 320 are examples of the audio frame 212 and the metadata frame 222, respectively, of FIG. 2. The encoded audio frame 330 and the encoded audio frame 340 are two different examples of the encoded frame 232 of FIG. 2, where the encoded audio frame 330 replaces audio bits of the audio frame 310 with metadata bits of the metadata frame 320, and where the encoded audio frame 340 appends the metadata bits to the audio bits. Generally, the encoded audio frame 330 has a same length and includes the same number of samples as the audio frame 310. In addition, the encoded audio frame 330 includes a subset of the audio bits of the audio frame 310 and a full set of the metadata bits of the metadata frame 320. In comparison, the encoded audio frame 340 is longer than the audio frame 310 by including a larger number of samples. In addition, the encoded audio frame 340 includes the full set of the audio bits of the audio frame 310 and the full set of the metadata bits of the metadata frame 320.

In an example, the audio frame 310 includes a number of audio samples 312A through 312K. "K" is a positive integer indicating the total number of audio samples and depends on the sampling rate and on the length of the audio frame 310. Each audio sample contains a portion of audio data by including a number "N" of audio bits (e.g., has an "N-bit" resolution), starting with a most significant bit 314 and ending with a least significant bit 316. For instance, the frame length is eight milliseconds, the sampling rate is sixteen kHz, and the bit resolution is sixteen. In this illustration, the audio frame 310 is eight milliseconds long and includes one-hundred twenty-eight audio samples, and each audio sample is sixteen bits long.

In comparison, the metadata frame 320 includes header data 322, version type data 324, payload data 326, and checksum data 328. The header data 322, version type data 324, payload data 326, and checksum data 328 forms portions of the metadata frame 320 including, respectively, a header, a version type, a payload, and a checksum and can be referred herein for short as the header, the version type, the payload, and the checksum. The metadata frame 320 is represented by a number of bits, where a first subset of the bits represent the header data 322, a second subset of the bits represent the version type data 324, a third subset of the bits represent the payload data 326, and a fourth subset of the bits represent the checksum data 328. The number of bits for each of these portions can be different. In an example, the header data 322 is eight bits long and indicates to an encoder that the frame containing this header data 322 is a metadata frame. The version type data 324 indicates a type of the metadata frame 320, where each type corresponds to a particular bit field structure and indicates a length of the payload data 326. The length refers to the capacity of the payload data 326, such as the total number of bits that represent the payload data 326. The payload data 326 can include raw measurement data and/or processed data usable by one or more audio processing application. The length of the payload data 326 depends on and is indicated by the version type data 324. Generally, the payload data 326 includes one or more audio properties. If more than one audio property is indicated, the payload data 326 can be organized in multiple sub-fields, each of which may include measured data and/or processed data corresponding to one of the audio properties. The checksum data 328 includes data generated from any or a combination of the header data 322, version type data 324, and the payload data 326 and is usable to verify that the integrity of the metadata frame 320.

The encoded audio frame 330 includes a number of encoded audio samples 332A through 332K, such that the encoded audio frame 330 has the same number "K" of samples as the audio frame 310. Each encoded audio sample includes the same number "N" of bits (e.g., has the "N-bit" resolution) as an audio sample of the audio frame 310, starting with a most significant bit 334 and ending with a least significant bit 336. Referring to the illustration above, the encoded audio frame 330 is eight milliseconds long and includes one-hundred twenty-eight encoded samples, and each encoded sample is sixteen bits long. In each encoded audio sample, a subset of the bits includes a corresponding subset of audio bits 318 of an audio sample and a remaining subset of the bits includes a corresponding subset of metadata bits 321 of the metadata frame 320. Continuing with the illustration, the first fifteen bits of the encoded audio sample 332A includes the first fifteen audio bits of the audio sample 312A, whereas the least significant bits 336 of the encoded audio sample 332A includes one metadata bit (e.g., the first header bit) of the metadata frame 320.

The encoded audio frame 340 represents a different technique for encoding the metadata frame 320 in the audio frame 310. Here, the sampling rate is increased by adding one or more samples and by including the metadata bits in the additional sample(s). In particular, the encoded audio frame 340 includes audio sample 342A through audio same sample 342K, each of which corresponds to a different one of the audio sample 312A through the audio sample 312K (e.g., audio sample 342A is the same as audio sample 312A, and audio sample 342K is the same as the audio sample 312K). Additionally, the encoded audio frame 340 includes one or more appended samples 344. Each appended sample has the same length as an audio sample (e.g., has the "N-bit" resolution). The total number of appended samples 344 can depend on a targeted sampling rate. For instance, if the sampling rate is doubled relative to the audio frame 310, the encoded audio frame 340 includes the same number of appended samples 344 as audio samples (e.g., "K" audio samples and "K" appended samples). Metadata bits 346 of the metadata frame 320 can be included in the appended sample(s) 344. Depending on the length of each appended sample, the metadata bits 346 can be contained in one appended sample or spread across multiple appended samples.

To illustrate, the audio frame 310 includes one-hundred twenty-eight audio samples, each of which is sixteen bits long. The metadata frame 320 is represented by forty-eight metadata bits. In this illustration, the encoded audio frame 340 includes the one-hundred twenty-eight audio samples and three appended samples, where each appended sample is sixteen bits long. The first appended sample includes the first sixteen metadata bits, the second appended sample includes the next sixteen metadata bits, and the third appended sample includes the last sixteen metadata bits. In another illustration, the sampling rate is doubled form sixteen kHz to thirty-two kHz. In this illustration, the encoded audio frame 340 includes the one-hundred twenty-eight audio samples and one-hundred twenty-eight appended samples. The forty-eight metadata bits can be included in the first three appended samples (or another set of three appended samples). Alternatively, the first metadata bit can be included in the least significant bit of the first appended sample and the remaining bits of this appended sample can be set to zero, the second metadata bit can be included in the least significant bit of the second appended sample and the remaining bits of this appended sample can be set to zero, and so on up to the forty-eighth being included in the forty-eighth, and the remaining appended samples (e.g., appended sample forty-nine through one-hundred twenty-eight) can contain all zero bits.

Figure 4:
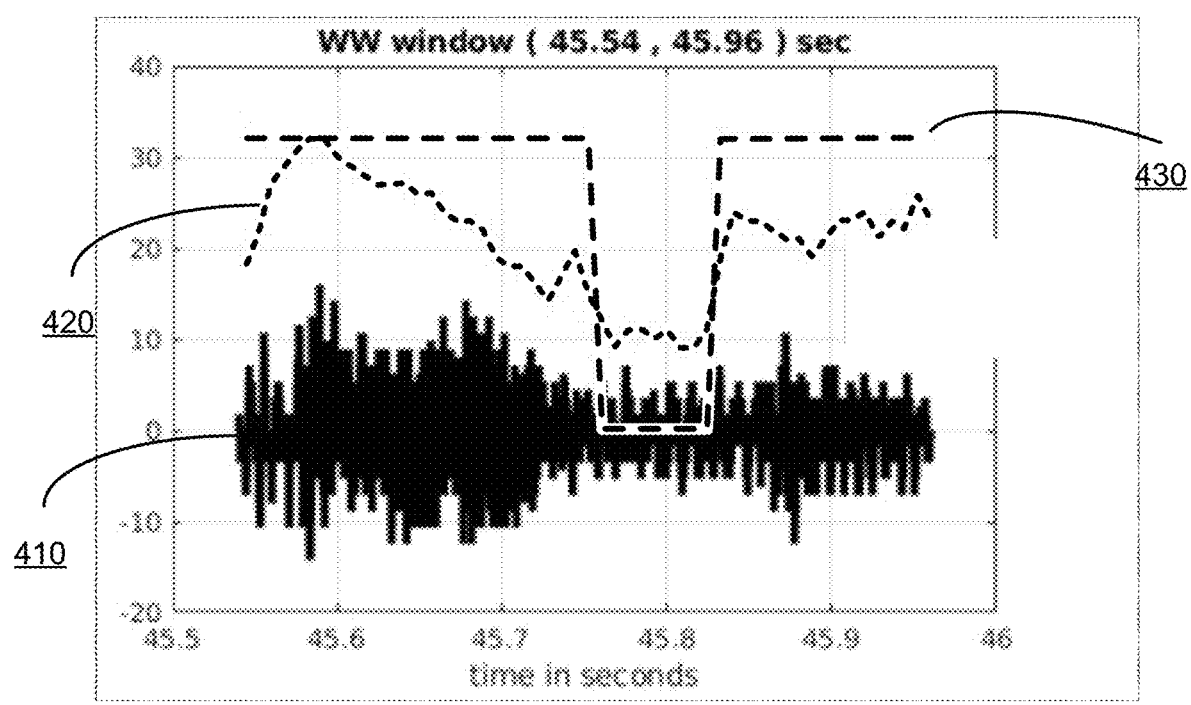
FIG. 4 illustrates an example of audio and related echo return loss enhancement measurements, according to embodiments of the present disclosure.
Figure 4:
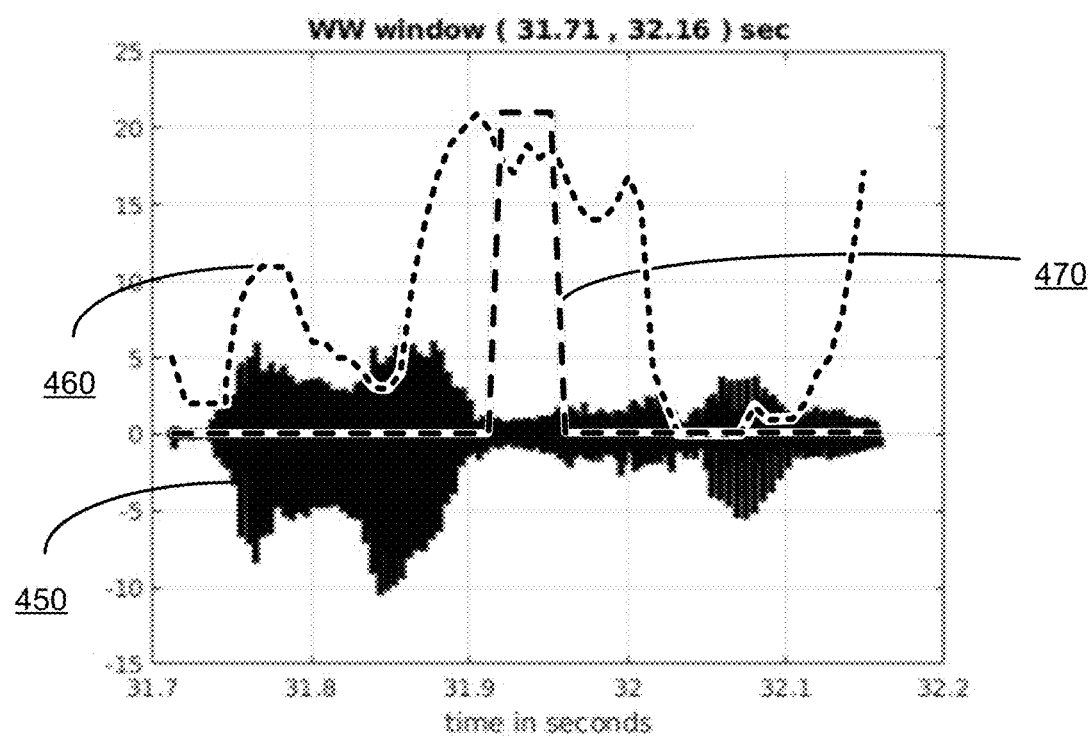

FIG. 4 illustrates an example of audio and related echo return loss enhancement measurements, according to embodiments of the present disclosure. As explained herein above, metadata can indicate whether audio data originated from a near end source or from a far end source. The determination of the type of source can involve echo return loss enhancement measurements. The raw echo return loss enhancement measurements can be included in the metadata (e.g., as a set of bits in a payload of a metadata frame). Additionally or alternatively, the determination can be included as an echo return loss enhancement flag (e.g., a single bit in the payload set to "0" to indicate a near end source and set to "1" to indicate a far end source).

The top plot of FIG. 4 illustrates the case of suppressing a wake word. In particular, the top plot shows audio 410 processed by an audio front end and corresponding to the wake word. Echo return loss enhancement measurements 420 are performed on the audio 410. In addition, an echo return loss enhancement tracking model 430 is plotted, tracks the echo return loss enhancement measurements 420, and is associated with a far end source. Because an overlap between the echo return loss enhancement tracking model 430 and the audio 410 exists and is larger than a certain overlap threshold (e.g., sixty percent), the audio 410 (or, equivalently, the wake word) is determined to have originated from a far end source. In this case, the audio 410, the echo return loss enhancement measurements 420, and the far end source determination (e.g., an echo return loss enhancement flag of "1") can be encoded in a same encoded frame.

The bottom plot of FIG. 4 illustrates the case of accepting a wake word. In particular, the bottom plot shows audio 450 processed by the audio front end and corresponding to the wake word. Here also, echo return loss enhancement measurements 460 are performed on the raw audio 450 and an echo return loss enhancement tracking model 470 is plotted, tracks the echo return loss enhancement measurements 460, and is associated with a near end source. Because an overlap between the echo return loss enhancement tracking model 470 and the audio 450 exists and is larger than a certain overlap threshold (e.g., sixty percent), the audio 450 (or, equivalently, the wake word) is determined to have originated from a near end source. In this case, the audio 450, the echo return loss enhancement measurements 460, and the near end source determination (e.g., an echo return loss enhancement flag of "0") can be encoded in a same encoded frame.

Figure 5:
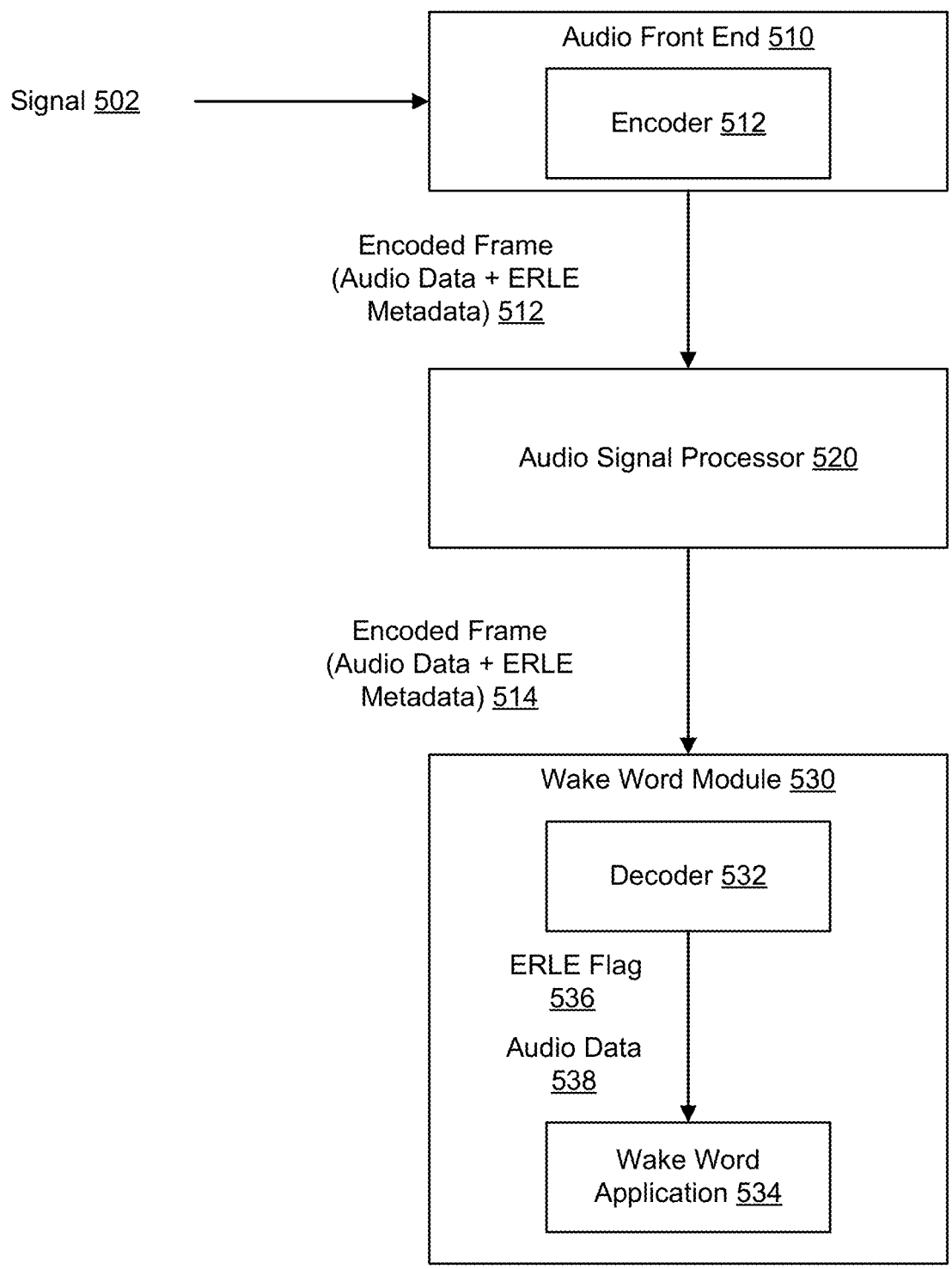
FIG. 5 illustrates an example of encoding echo return loss enhancement metadata, according to embodiments of the present disclosure.

FIG. 5 illustrates an example of encoding echo return loss enhancement metadata, according to embodiments of the present disclosure. As illustrated, an audio front end 510 receives a signal 502. This signal 502 can include an audio signal detected by a microphone and reference signal. An encoder 512 of the audio front end 510 generates an encoded frame 512 that includes audio data and echo return loss enhancement metadata. Here, the echo return loss enhancement metadata includes echo return loss enhancement measurements performed on the signal 502. Additionally or alternatively, the echo return loss enhancement metadata includes a determination based on such measurements of whether the signal 502 originated from a near end source or a far end source. This determination can be included as an echo return loss enhancement flag.

The encoded frame 512 is input to an audio signal processor 520 that then passes the encoded frame 512 to a wake word module 530 as an encoded frame 514. Next, a decoder 532 of the wake word module 530 decodes the encoded frame 514 and extracts echo return loss enhancement metadata including an echo return loss enhancement flag 536 and audio data 538. A wake word application 534 of the wake work model 530 detects the start and end time of the wake word if the wake word is present in the audio data processed by the audio front end 510. The wake word application 534 can determine whether the audio data 538 originated from a near end source or a far end source depending on the value of the echo return loss enhancement flag 536. When an overlap between the echo return loss enhancement flag 536 with the audio data 538 exists and is larger than a certain overlap threshold (e.g., sixty percent), the audio data 538 (or, equivalently, the wake word) is determined to have originated from a far end source. If from a far end source, the audio data 538 is suppressed.

In an example, the encoded frame 514 includes a header, a version type, a payload, and a checksum. The payload includes the echo return loss enhancement flag 536 and, optionally, the echo return loss enhancement measurements. Examples of such an encoded frame, its encoding, and its decoding are further illustrated in the next figures.

Figure 6:
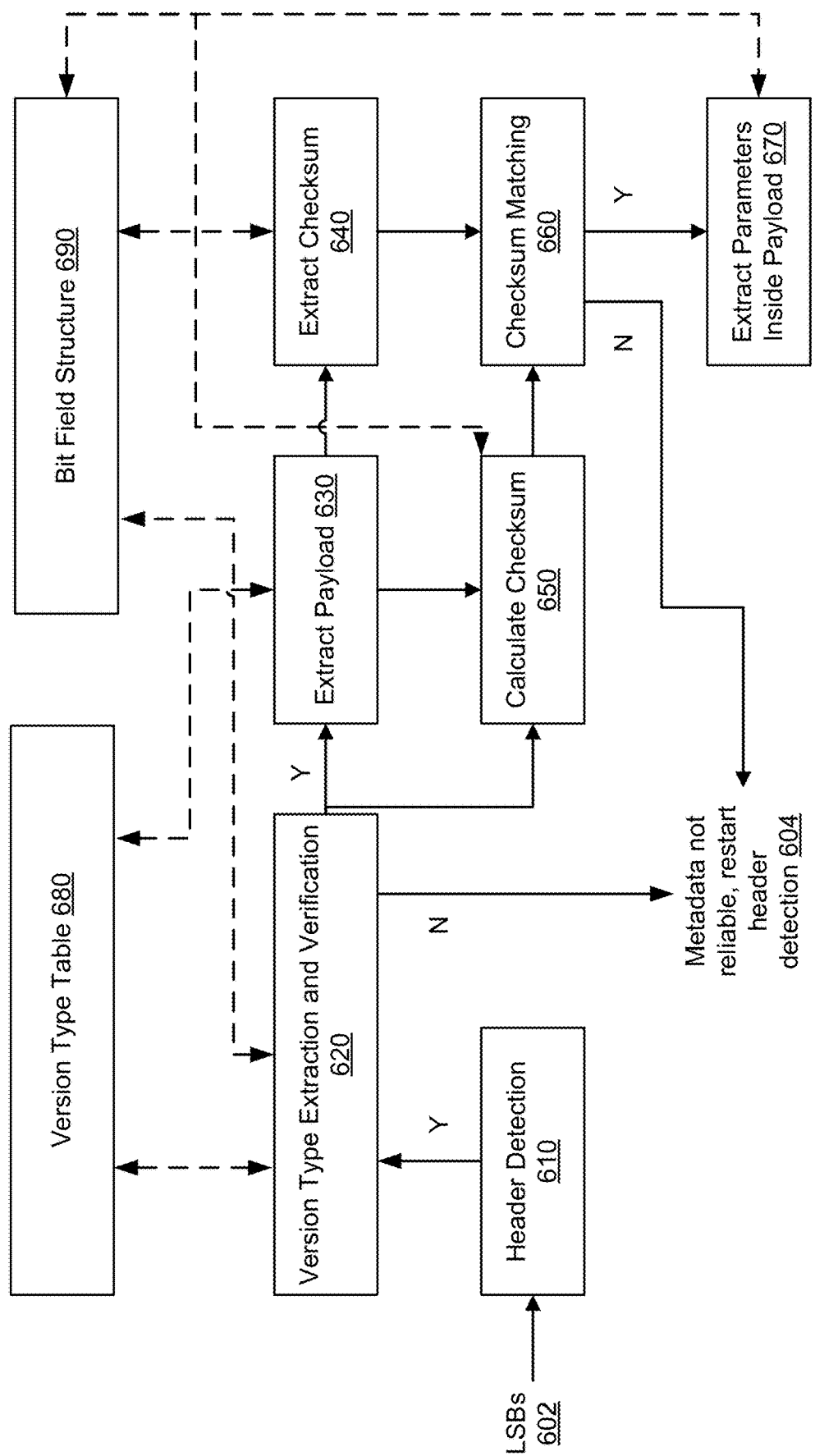
FIG. 6 illustrates an example of decoding an encoded frame based on header and version type information, according to embodiments of the present disclosure.

FIG. 6 illustrates an example of decoding an encoded frame based on header and version type information, according to embodiments of the present disclosure. The decoding can be performed by a decoder, similar to the decoder 240 of FIG. 2 or the decoder 532 of FIG. 5. In particular, the decoder receives the encoded frame that includes multiple encoded samples, each of which includes multiple bits. The decoder extracts the least significant bits 602 from the encoded samples and performs a header detection 610. The header detection 610 includes comparing the first set of the least significant bits (e.g., the first eight least significant bits) with a known header of a metadata frame. Upon determining a match, the header is detected from the least significant bits and the decoder processed to perform a version type extraction and verification 620.

The version type extraction and verification 620 includes extracting the next set of least significant bits (e.g., the next eight least significant bits) and comparing this set with a known version type of a metadata frame. Known version types may be available from a version type table 680. If a match exists, the decoder proceeds to extract a payload 630. However, if no match exists, the decoder can declare 604 that the metadata is not reliable and can restart the header detection.

The version type can indicate a length of the payload. This indication can be explicitly defined in the version table 680. Additionally or alternatively, the length and specific bit sub-fields of the payload (e.g., number of sub-fields and location of bits belonging to each sub-field) can be specified in a bit file structure 690 that corresponds to the version type. To extract the payload 630, the decoder determines the length and/or the structure of the payload and extracts the corresponding set of least significant bits from the least significant bits 602.

In addition, the bit field structure 690 specifies the structure of a checksum (e.g., length and location of the encoded checksum bits). The decoder extracts 640 the corresponding checksum from the least significant bits 602. Further, the decoder calculates 650 a checksum from one or more of the extracted payload, version type, and/or header. The calculated checksum and the extracted checksum are compared to determine whether a checksum match 660 exists. If no, the decoder can declare 604 that the metadata is not reliable and can restart the header detection. If so, the decoder extracts 670 one or more parameters that are included in the extracted payload based on the structure of the payload (e.g., determines the echo return loss enhancement measurements and/or echo return loss enhancement flag).

Figure 7:
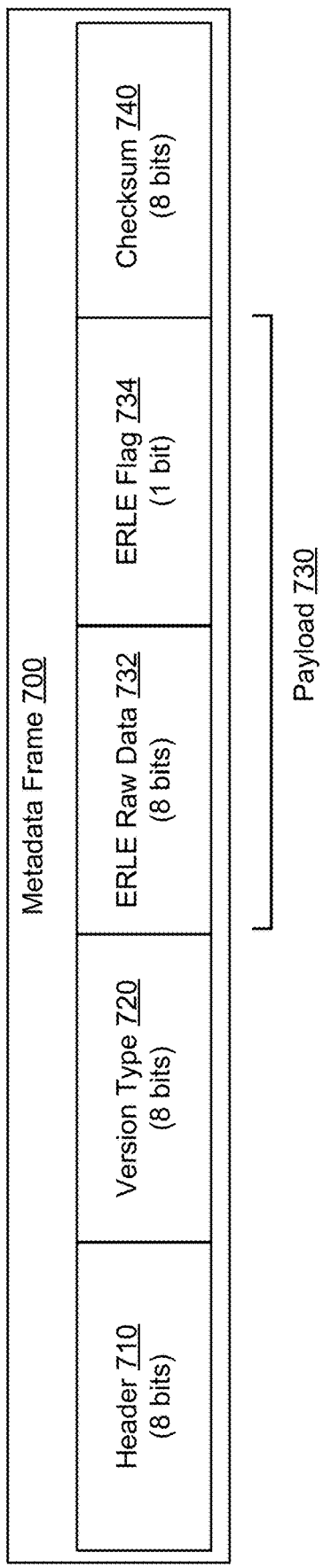
FIG. 7 illustrates an example of a metadata frame that includes a payload, according to embodiments of the present disclosure.

FIG. 7 illustrates an example of a metadata frame 700 that includes a payload 730, according to embodiments of the present disclosure. In this example, the payload 730 (e.g., payload data of the metadata frame 700) stores echo return loss enhancement related parameters. Nonetheless, other types of parameters can be included in the payload 730.

As illustrated, the metadata frame 700 additionally includes a header 710 (e.g., header data, a version type 720 (e.g., version type data), and a checksum 740 (e.g., checksum data). The header 710 can store eight bits, the value of which can be set to form a known pattern (e.g., "10100101") indicating that the frame type is a metadata frame. The version type 720 can also store bits, the value of which can be set to form a known pattern (e.g., "00100000") indicating a version of the metadata frame 700. The version can be associated with a particular bit field structure indicating the length of the payload, the number of sub-fields in the payload, the start and end of each sub-field, and the type of parameter that each sub-field includes. The checksum 740 can also store bits, the value of which can be derived by applying a hash function to one or more of the header 710, the version type 720, and/or the payload 730.

In an example, the payload 730 includes two sub-fields. A first sub-field includes eight bits representing echo return loss enhancement measurements, shown in FIG. 7 as ERLE raw data 732. A second sub-field includes a single bit indicating whether corresponding audio originated from a near end source or a far end source, shown in FIG. 7 as an ERLE flag 734.

Figure 8:
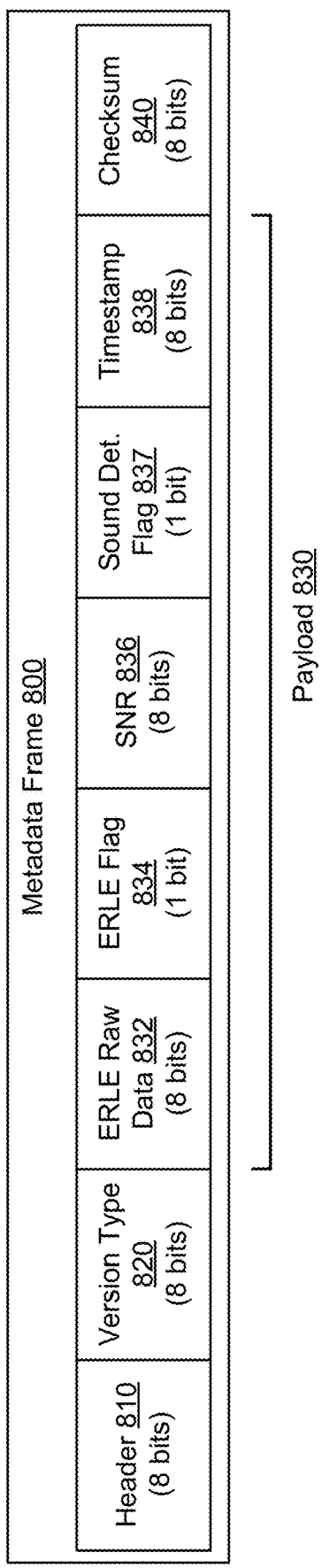
FIG. 8 illustrates another example of a metadata frame that includes multiple audio properties in the payload, according to embodiments of the present disclosure.

FIG. 8 illustrates another example of a metadata frame 800 that includes multiple audio properties in a payload 830 (e.g., payload data), according to embodiments of the present disclosure. Here, and like the metadata frame 700 of FIG. 7, the metadata frame 800 also includes a header 810 (e.g., header data), a version type 820 (e.g., version type data), and a checksum 840 (e.g., checksum data). However, the version type 820 indicates a different version of a metadata frame in the above example of FIG. 7. In particular, the version type 820 indicates a relatively longer payload with multiple properties included therein (e.g., echo return loss enhancement parameters, SNR, whether sound is presented or not, and time stamp).

In an example, the header 810 can store eight bits, the value of which can be set to form a known pattern (e.g., "10100101" that is the same as the known pattern of the header 710) indicating that the frame type is a metadata frame. The version type 820 can also store bits, the value of which can be set to form a known pattern (e.g., "010000000" that is different from the known pattern of the version type 720) indicating a version of the metadata frame 800. The version can be associated with a particular bit field structure indicating the length of the payload, the number of sub-fields in the payload, the start and end of each sub-field, and the type of parameter that each sub-field includes. The checksum 840 can also store bits, the value of which can be derived by applying a hash function to one or more of the header 810, the version type 820, and/or the payload 830.

In the illustration of FIG. 8, the payload 830 includes five sub-fields. A first sub-field includes eight bits representing echo return loss enhancement measurements, shown in FIG. 8 as ERLE raw data 832. A second sub-field includes a single bit indicating whether corresponding audio originated from a near end source or a far end source, shown in FIG. 8 as an ERLE flag 834. A third sub-field includes eight bits representing an SNR 836. A fourth sub-field includes a single bit indicating whether corresponding audio includes sound is merely ambient noise, shown in FIG. 8 as a sound detection flag 837. A fifth sub-field includes eight bits representing a timestamp 838 of when the corresponding audio was received.

Figure 9:
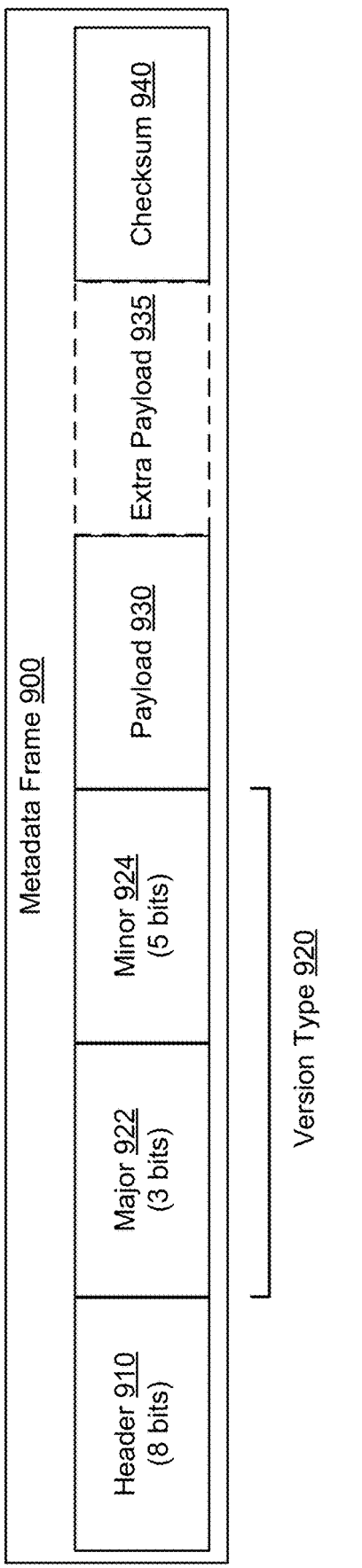
FIG. 9 illustrates another example of a metadata frame that includes a version type indicating the payload, according to embodiments of the present disclosure.

FIG. 9 illustrates another example of a metadata frame 900 that includes a version type 920 (e.g. version type data) indicating a payload 930 (e.g. payload data), according to embodiments of the present disclosure. Here, the version type 920 includes two sub-fields, shown as a major 922 and a minor 924. The first sub-field (e.g. the major 922) can be used to indicate a version of the metadata, where this version includes a specific set of parameters and this specific set changes between the versions (e.g., version 1.0 including echo return loss enhancement parameters, version 2.0 including echo return loss enhancement parameters and SNR, and the like). The second sub-field (e.g., the minor 924) can be used to indicate an extension to a version, where the extension allows extra payload 935 storing additional parameters, where these parameters are of the same type as the set specific to the version (e.g., version 1.1 includes additional echo return loss enhancement parameters).

As illustrated, the metadata frame 900 also includes a header 910 and a checksum 940. The header 910 can store eight bits, the value of which can be set to form a known pattern (e.g., "10100101" that is the same as the known pattern of the header 710) indicating that the frame type is a metadata frame. The checksum 940 can also store bits, the value of which can be derived by applying a hash function to one or more of the header 910, the version type 920, the payload 930, and/or the extra payload 935.

In an example, the major 922 uses three bits. This first sub-field of the version type 922 is incremented when the content of the payload 930 has completely changed. The minor 924 uses the next five bits and is incremented when the new payload is an extension of the previous payload version.

To illustrate, and referring back to echo return loss enhancement metadata, the major 922 is labeled as "1" (as in version type 1.0, 1.1, and the like) and its binary representation is set to "001." If a completely different set of parameters is to be sent, such as SNR, the major 922 is incremented to "2" (as in version type 2.0, 2.1, and the like) and its binary representation set to "010."

In comparison, the minor 924 is used to characterize extendable payload. The minor 924 is labeled as "0" (as in version type 1.0, 2.0 and the like) and its binary representation is set to "00000" for transmission of echo return loss enhancement raw measurements and an echo return loss enhancement flag. The minor 924 can be increased to "1" (as in version type 1.1, 2.1 and the like) and its binary representation is set to "00001" for the additional transmission of a playback flag.

Figure 10:
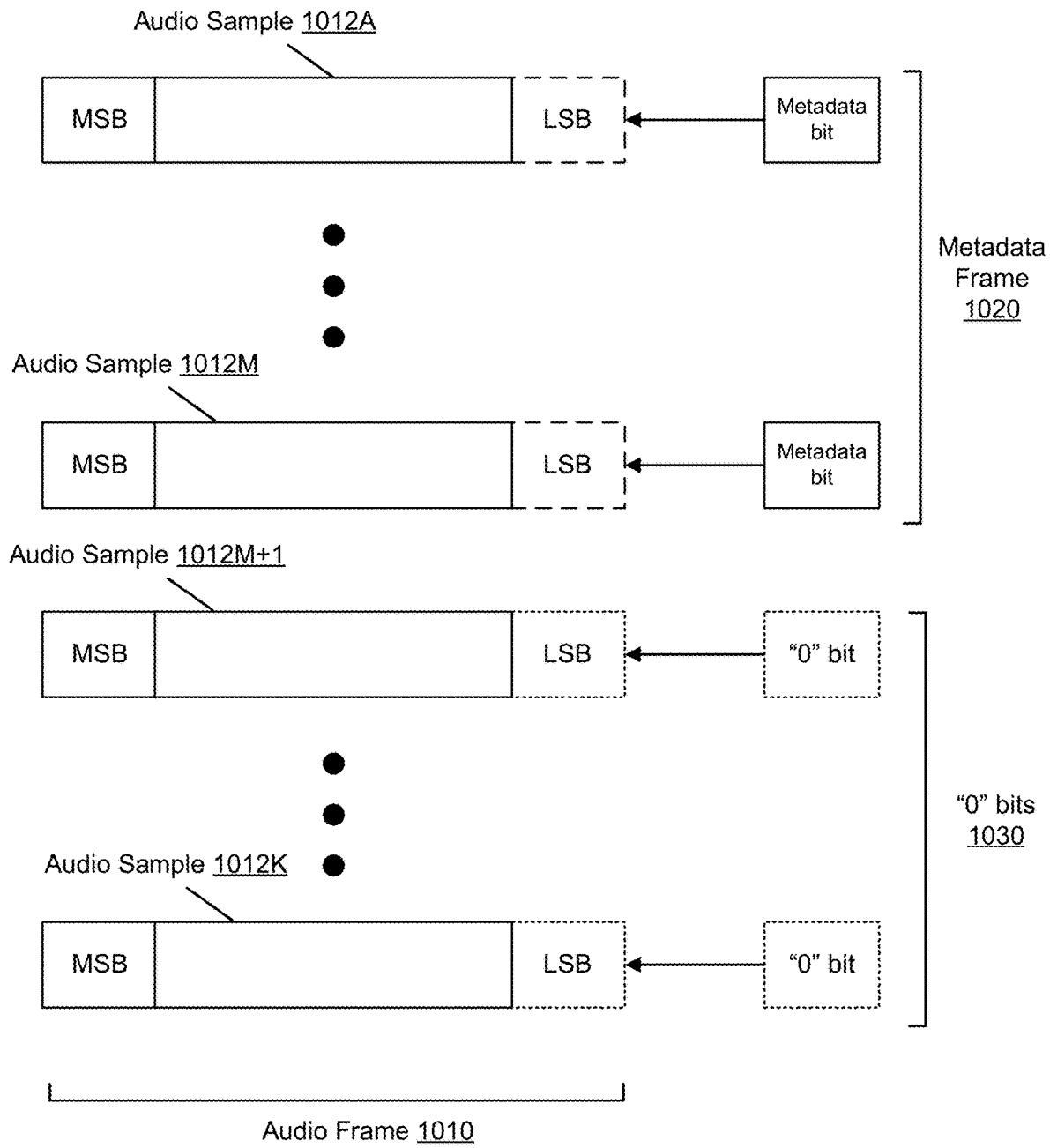
FIG. 10 illustrates an example of encoding a metadata frame in an audio frame, according to embodiments of the present disclosure.

FIG. 10 illustrates an example of encoding a metadata frame 1020 in an audio frame 1010, according to embodiments of the present disclosure. The metadata frame 1020 can be similar to any of the metadata frame 320 of FIG. 3, the metadata frame 700 of FIG. 7, the metadata frame 800 of FIG. 9, or the metadata frame 900 of FIG. 9. The audio frame 1010 can be similar to the audio frame 310 of FIG. 3. Generally, the metadata frame 1010 has a length "M" (e.g., contains "M" metadata bits, where M" is thirty-three bits as in FIG. 7 or M is equal to fifty as in FIG. 8). The length "M" can be dependent on the version type of the metadata fame 1020. The audio frame 1010 includes "K" audio samples and, in turn, each audio sample includes "N" audio bits (e.g., "K" is one-hundred twenty-eight and "N" is sixteen). The encoding includes replacing a portion "L" of the audio bits with the "M" metadata bits, where "L" is smaller than "K×N." The bit replacement can be spread out across multiple audio samples, such that the metadata bits are distributed across these audio samples.

In an example, least significant bits of the audio samples are used for the encoding. In particular, the first audio sample 1012A of the audio frame 1010 includes a least significant bit (shown with a dashed rectangle). This least significant bit is replaced with the first metadata bit of the metadata frame 1220 (the replacement is shown with an arrow) to form an encoded audio sample. The replacement is repeated across the various audio samples until reaching the M-th audio sample 1012M of the audio frame 1010. In this audio sample 1012M, the least significant bit is replaced with the last "M" metadata bit from the metadata frame 1020. In this way, each encoded audio sample includes a portion of the payload data, a portion of the version type data, or a portion of the header data, in a least significant bit of the encoded audio sample, and the resulting encoded audio frame includes a plurality of the encoded audio samples.

In the illustration of FIG. 10, the audio frame 1010 includes additional "L" audio samples, where "L=K−M+1." This is the case where the number "M" of metadata bits is smaller than the number "K" of audio samples. The encoding can stop at the M-th audio sample 1012M. If so, each of the remaining "L" audio samples includes a least significant bit (illustrated with a dotted rectangle) that continues to include an audio bit. In particular, the least significant bit of audio sample 1012M+1 includes an audio bit and so forth until the least significant bit of the last audio sample 1012K that also includes an audio bit. Alternatively, the encoding can continue after the M-th audio sample. In this case, the least significant bit in each of the remaining "L" audio samples is zeroed (e.g., its bit value set to "0"). FIG. 10 illustrates this zeroing by using "L" zero bits 1030, each of which is added to one the least significant bits in the remaining "L" audio samples and replaces the audio bit that otherwise is contained in the least significant bit. For instance, the least significant bit of audio sample 1012M+1 is set to zero and so forth until the least significant bit of the last audio sample 1012K is also set to zero.

Variations to the above encoding are possible. For instance, the number "K" of audio samples can be smaller than the number "M" of metadata bits (e.g., one-hundred twenty-eight audio samples, in comparison to one-hundred thirty-two metadata bits). In this case, two variations are possible. In a first variation, the encoding of the remaining number "M'" of metadata bits (e.g., "M'=M−K," such as "M'=8") can spill over the next audio frame such that a portion of audio data in the audio frame 1010 is replaced with a first portion of the metadata and a portion of the next audio frame is replaced with a second portion (e.g., a remaining portion) of the metadata. In other words, the "M'" metadata bits replace least significant bits in "M'" audio samples of the next audio frame. In a second variation, more than one least significant bits can be used in some or all of the audio samples of the audio frame 1010, such that a least significant bit in each one of the plurality of audio samples 1012A-1012K is replaced with a portion of the metadata. For instance, two least significant bits are used as minimally needed. Here, each of the first "M'" audio samples (e.g., the first eight audio samples of the audio frame 1010) would encode two metadata bits by replacing the two least significant bits. And each of the remaining "K-M'" audio samples (e.g., the remaining one-hundred twenty audio samples of the audio frame 1010) would encode one metadata bits by replacing the least significant bit. Alternatively, two least significant bits are used across all the "K" audio samples and zeroing is applied as needed (e.g., each of the first "132/2=66" audio samples has its two least significant bits replaced with metadata bits, and each of the remaining "128−66=62" audio samples has its two least significant bits zeroed or left as is).

Additionally, the above encoding is described in connection with using a least significant bit in an audio sample. However, the embodiments are not limited as such. Instead, any bit location can be used, and that bit location can be the same across the different audio samples. For instance, the most significant bit, or two bits away from the least significant bit, can be used in each audio sample to encode a metadata bit.

Although FIG. 10 illustrates an encoding technique in which audio bits are replaced with metadata bits, other encoding techniques are possible. For instance, and as described in connection with the encoded audio frame 340 of FIG. 3, the encoding can include increasing the sample rate, whereby additional samples are appended to the audio samples 1012A-1012K, and including the metadata bits of the metadata frame 1020 in one or more of the additional samples.

Figure 11:
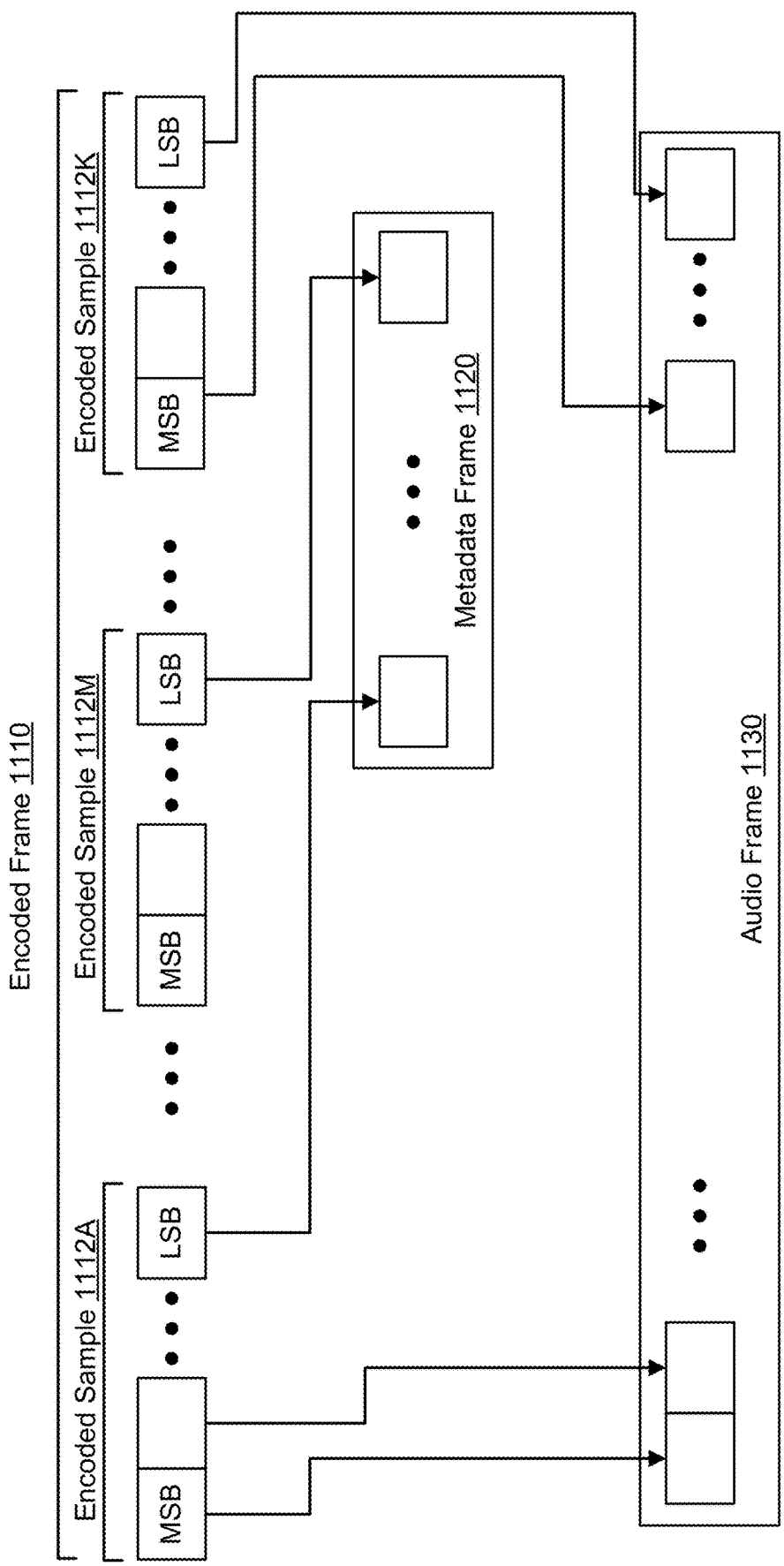
FIG. 11 illustrates an example of decoding an encoded frame, according to embodiments of the present disclosure.

FIG. 11 illustrates an example of decoding an encoded frame 1110, according to embodiments of the present disclosure. The encoded frame 1110 can be similar to the encoded audio frame 330 of FIG. 3 and can include encoded metadata and audio data, per the encoding described in FIG. 10. In particular, the encoded frame 1110 "K" encoded samples, where "K" is the same as the number "K" of audio samples (e.g., one-hundred twenty-eight encoded samples). Each encoded sample includes "N" encoded bits, where "N" is the same as the number N" of audio bits in an audio sample (e.g., sixteen encoded bits). When one metadata bit is encoded in an encoded sample, the encoded sample includes "N−1" of audio bits (e.g., fifteen audio bits and one metadata bit). Similarly, when zeroing of one audio bit is used in the encoding, an encoded sample includes "N−1" of audio bits (e.g., fifteen audio bits and one zeroed bit). Of course, if more than one metadata bit or more than one bit is zeroed, an encoded sample includes "N−J" of audio bits, where "J" is the number of encoded metadata bits or zeroed audio bits.

In the interest of clarity of explanation, the encoded frame 1110 is illustrated as including a single metadata bit in the least significant bit of an encoded sample. Nonetheless, a different bit location can be used and this bit location can be the same across the different encoded samples. Additionally, a "J" number of bit locations can be used to encode "J" metadata bits in an encoded sample.

As illustrated, the encoded frame 1110 includes multiple encoded samples, such as an encoded sample 1112A through an encoded sample 1112K and an encoded sample 1112M in between. Here, "M" corresponds to the number of encoded metadata bits (e.g., "M" is equal to thirty-three as in the case of the metadata frame 700 of FIG. 7) and "K-M" (e.g., "128−33=95" as in the case of the metadata frame 700 of FIG. 7) corresponds to the number of zeroed bits or the audio bits that were not replaced in the least significant bits.

From the first "M" encoded samples 1112A through 1112M, the decoder extracts the least significant bit in each of such encoded samples and orders the extracted least significant bits in a sequence that form extracted "M" metadata bits of an extracted metadata frame 1120. For instance, the least significant bit in the first encoded sample 1112A is extracted as the most significant bit of the metadata frame 1120, the least significant bit of the next encoded sample is extracted as the next bit of the metadata frame 1120 and so on, until the least significant bit in the M-th encoded sample 1112M is extracted as the least significant bit of the metadata frame 1120.

Remaining bits of the encoded samples 1112A through 1112K are extracted in a similar manner as audio bits that form an audio frame 1130. In particular, the first "N−1" (e.g., fifteen) encoded bits of the first encoded sample 1112A are extracted and set as the first "N−1" audio bits of the audio frame 1130, the next "N−1" encoded bits of the next encoded sample are extracted and set as the next "N−1"

audio bits of the audio frame 1130, and so on until the last "N−1" encoded bits of the last encoded sample 1112K are extracted and set as the last "N−1" audio bits of the audio frame 11130. If the same bit resolution is desired for the audio frame 11130 (e.g., sixteen audio bits per audio sample"), upon extracting "N−1" audio bits, another "0" bit, "1" bit," or random bit is added as the N-th audio bit, such that each of the "K" audio samples has an N-bit resolution and contains "N−1" audio bits and an extra added bit ("0", "1", or random).

Here also, although FIG. 11 illustrates a decoding technique that metadata bits from encoded audio samples, other decoding techniques are possible and can depend on the encoding. For instance, referring back to the encoded audio frame 340 of FIG. 3, the decoding can include extracting the audio bits from the audio samples and extracting the metadata bits from the appended samples.

Figure 12:
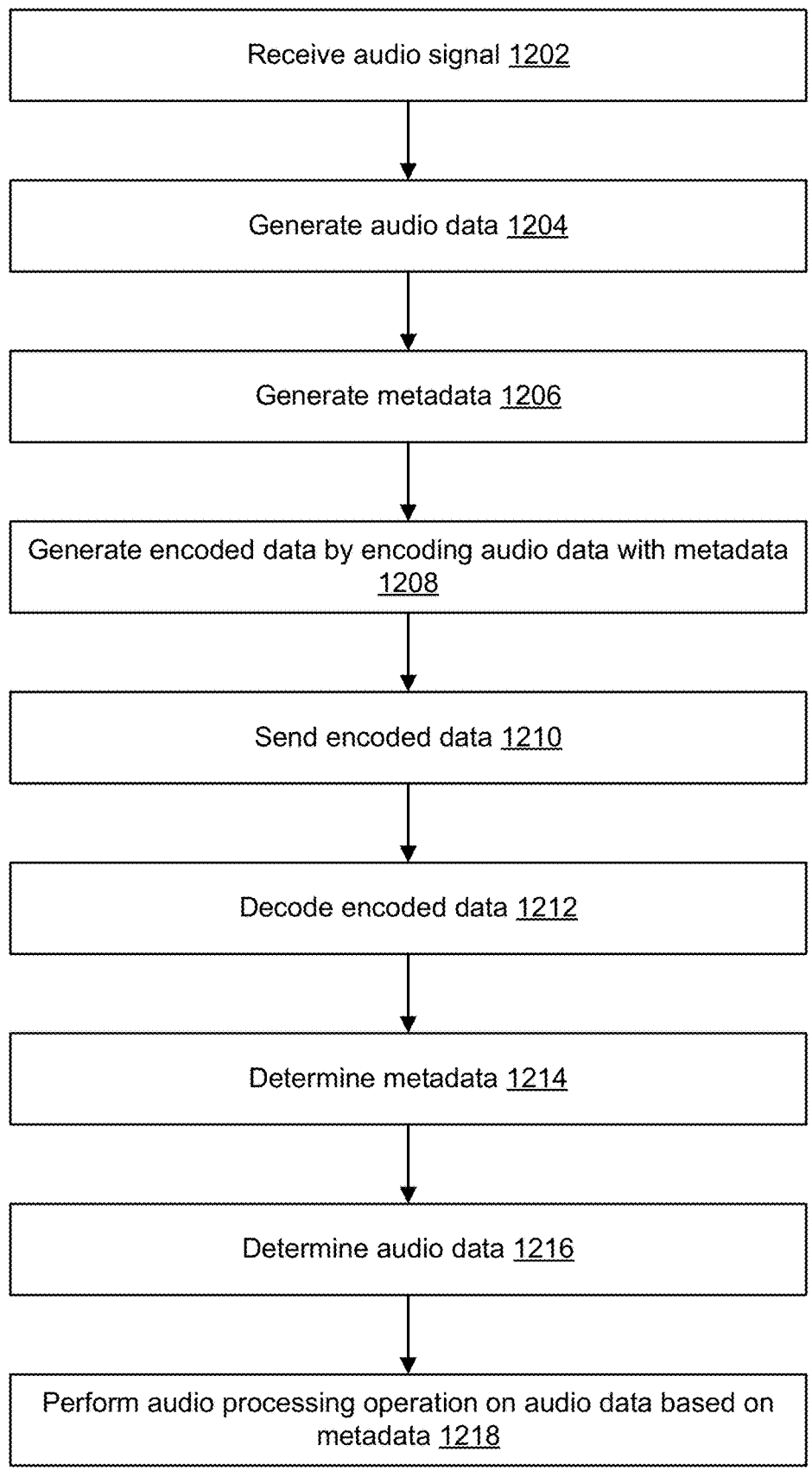
FIG. 12 illustrates an example of a flow for processing audio data and metadata based on encoded data, according to embodiments of the present disclosure.
Figure 13:
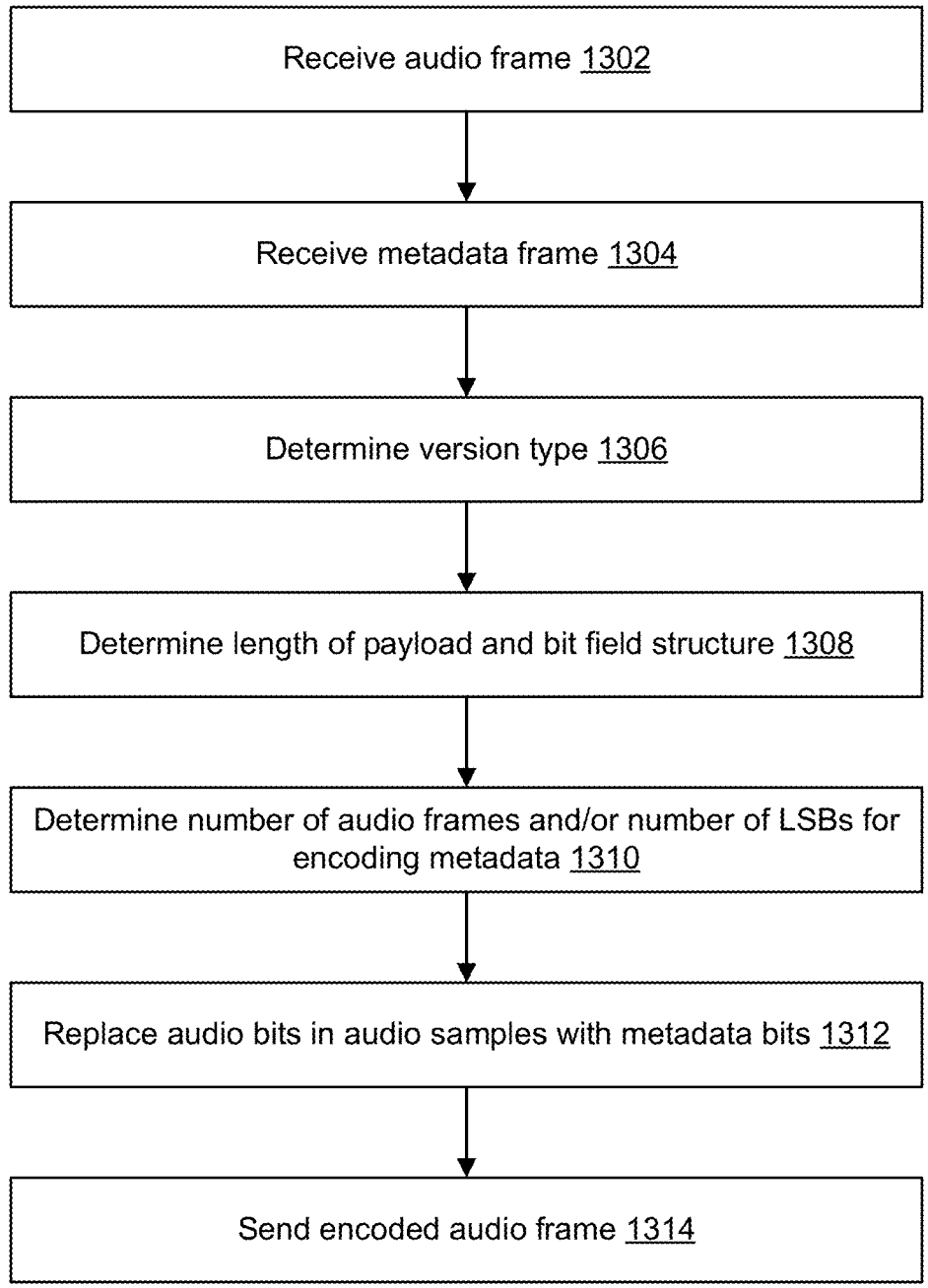
FIG. 13 illustrates an example of a flow for encoding audio data with metadata, according to embodiments of the present disclosure.
Figure 14:
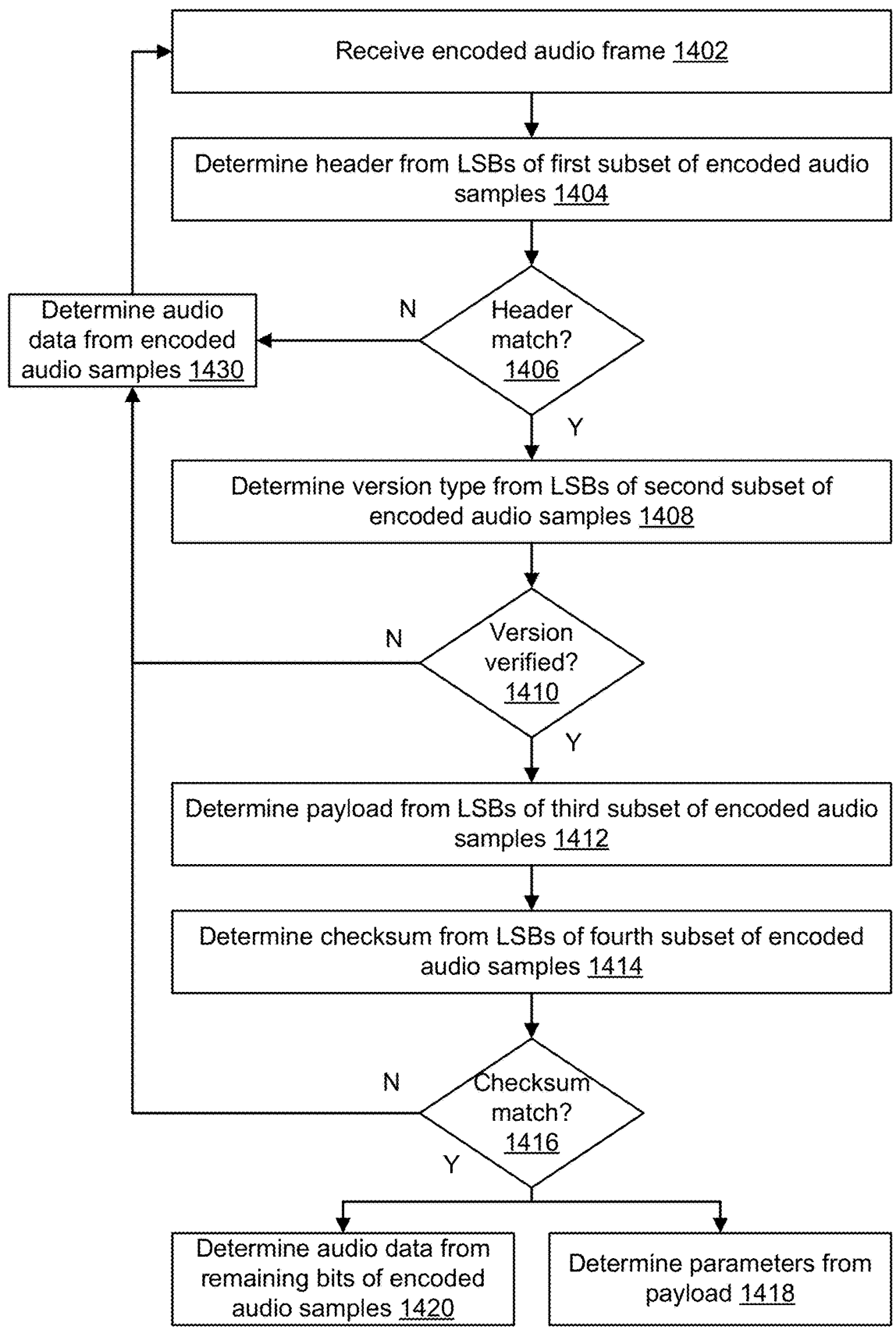
FIG. 14 illustrates an example of a flow for decoding encoded data that includes audio data and metadata, according to embodiments of the present disclosure.

FIGS. 12-14 illustrate examples of flows for audio processing that involve audio data encoded with metadata. Operations of the flows can be performed by a device, such as the device 110 described hereinabove. Some or all of the instructions for performing the operations of flows can be implemented as hardware circuitry and/or stored as computer-readable instructions on a non-transitory computer-readable medium of the device. As implemented, the instructions represent modules that include circuitry or code executable by processors of the device. The use of such instructions configures the device to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered.

FIG. 12 illustrates an example of a flow for processing audio data and metadata based on encoded data, according to embodiments of the present disclosure. The flow may start at operation 1202, where the device receives an audio signal. For example, an audio processing system of the device receives the audio signal, where the audio signal can correspond to audio detected by one or more microphones and can include a reference signal.

In an example, the flow includes operation 1204, where the device generates audio data. For instance, the audio processing system includes a digitization module that generates audio frames based on the audio signal. Each audio frame has a frame length (e.g., captures eight milliseconds of audio) and includes a number of audio samples (e.g., one-hundred twenty-eight samples, at a sampling rate of sixteen kHz). Each audio sample contains a portion of the audio data by including a number of audio bits (e.g., sixteen audio bits corresponding to a sixteen bit resolution).

In an example, the flow includes operation 1206, where the device generates metadata. For instance, the audio processing system includes a property determination module that generates the metadata based on the audio signal and/or the audio frames. The metadata indicates one or more properties of the audio and such properties are usable by one or more audio processing applications in order to perform operations on audio data. The property determination module can generate the metadata as metadata frames. Each metadata frame can include header data, version type data, payload data, and checksum data, where each of these data portions of the metadata frame can be represented by a number of metadata bits. The payload data can be first data associated with the audio data. The version type data can be second data that indicates a total number of bits that represent the first data. A property can be included in a portion of the payload data.

In an example, the flow includes operation 1208, where the device generates encoded data by encoding the audio data with the metadata. For instance, the encoding includes adding a portion of the metadata to a portion of the audio data, where the encoded data includes the header data, the version type data, the payload data, and the checksum data and at least a remaining portion of the audio data. In one illustration, adding the two portions includes replacing a portion of the audio data is replaced with the metadata. In particular, the audio processing system includes an encoder that receives an audio frame corresponding to audio (e.g., to eight milliseconds of detected audio) and a metadata frame indicating a property of the audio. The encoder replaces a subset of audio bits across audio samples of the audio frame with metadata bits of the metadata frame. Additionally or alternatively, adding the two portions includes appending the metadata to the audio data. In particular, the encoder increases the sampling rate by appending one or more samples to the audio frame and includes the metadata bits in one or more of the appended samples.

In an example, the flow includes operation 1210, where the device sends the encoded data to an audio processing application. For instance, the audio processing system sends the encoded frame to a client of the audio processing system. The client can be included in the device and can host the audio processing application.

In an example, the flow includes operation 1212, where the device decodes the encoded data. For instance, the client includes a decoder that receives the encoded frame and extracts metadata bits from the encoded frame given known bit locations of these bits in encoded samples of the encoded frame. Similarly, the decoder extracts audio bits from the encoded frame from the remaining bit location in the encoded samples.

In an example, the flow includes operation 1214, where the device determines the metadata. For instance, the decoder regenerates the metadata frame from the extracted metadata bits. The payload of this frame is determined given the bit field structure of the metadata frame and the one or more properties indicated in the payload are determined.

In an example, the flow includes operation 1216, where the device determines the audio data. For instance, the decoder regenerates the audio frame from the extracted audio bits. If the same bit resolution is needed for each of the audio samples in the audio frame, "0" bits, "1" bits, or random bits can be added to bit locations from where the metadata bits were extracted.

In an example, the flow includes operation 1218, where the device performs an audio processing operation on the audio data based on the metadata. For instance, depending on the one or more properties determined from the metadata frame, the audio processing application selects an applicable operation and performs this operation on the audio data indicated by the audio data frame.

FIG. 13 illustrates an example of a flow for encoding audio data with metadata, according to embodiments of the present disclosure. The flow may start at operation 1302, where the device receives an audio frame. The audio frame includes "K" audio samples, and each audio sample includes "N" audio bits.

In an example, the flow includes operation 1304, where the device receives a metadata frame. For instance, the metadata frame includes a header, a version type, a payload, and a checksum. The header can include a number of bits that form a known bit pattern indicating that the bits to follow are metadata bits. The version type indicates a version and an extension of the metadata frame. Further, the version type is associated with a bit field structure indicating a length of the payload including any extra payload), the number of sub-fields in the payload, the type of audio property included in each sub-field, and the like. Each sub-field of the payload includes a number of bits that represent an audio property. The checksum can include a number of bits that are used to verify the integrity of the metadata frame, where these bits are set based on a hash function applied to the header, the version type, and/or the payload.

In an example, the flow includes operation 1306, where the device determines a version type. For instance, the encoder determines the version type from the metadata frame.

In an example, the flow includes operation 1308, where the device determines a length and a bit field structure. For instance, the version type indicates the length and the bit field structure. In particular, given the version type, the encoder can look-up a version type table that indicates the length and can determine the number and lengths of the payload's sub-fields.

In an example, the flow includes operation 1310, where the device determines a number of audio frames and/or the number of least significant bits (or particular bit locations) within each audio sample to use for the encoding of the metadata. This determination can depend on the length "M" of the metadata frame (or at least of the payload) and the number "K" of audio samples, where the length here refers to the number of metadata bits.

If the length of the metadata frame (e.g., the number of bits that represent the metadata frame) is smaller than the number of audio samples, the encoder can use one least significant bit (or some other particular bit location) per audio sample. For the "K–M" remaining audio samples, the encoder can determine to zero their respective least significant bits or retain the audio bits therein.

If the number of audio samples is smaller than the length of the metadata frame (e.g., the number of bits that represent the metadata frame), the encoder can use more than one least significant bit (e.g., two or more least significant bits or some other particular bit locations) per audio sample. Alternatively, for the "M–K" remaining metadata bits, the encoder can encode these metadata bits in a next audio frame.

In an example, the flow includes operation 1312, where the device replaces audio bits in audio samples with metadata bits. Depending on the number of "M" metadata bits, the number "K" of audio samples, and the number least significant bit (or some other bit location) to use per audio sample, the encoder encodes some or all of "M" metadata bits in the audio frame by replacing the applicable number of audio bits at the particular bit locations with these "M" metadata bits. As a result, an encoded audio frame is formed. The encoded audio frame has the same length as the audio frame and includes the same number "K" of encoded frames. Each encoded audio frame includes the same number of "N" bits. At least a portion (e.g., "M–K") of the encoded frames include metadata bits. For instance, the first header bit of the metadata bit is located in the least significant bit of the first encoded audio sample, the next header bits of the metadata bit is located in the least significant bit of the next encoded audio sample, and so on until the M-th bit of the metadata frame being included as the least significant bit of the M-th encoded audio sample.

In an example, the flow includes operation 1314, where the device sends the encoded audio frame. For instance, the encoder sends the encoded audio frame to the client of the audio processing system.

Over time, new versions and/or extensions of the metadata frame may be defined. Each of the new versions and/or extensions can be associated with a new version type and with a new bit field structure. The device can store an update, where the update includes information about the new version type and the new bit structure. From that point on, the encoder can use the new version type and the new bit structure to generate metadata frame associated with the new version and/or extension of an existing version.

FIG. 14 illustrates an example of a flow for decoding encoded data that includes audio data and metadata, according to embodiments of the present disclosure. The flow may start at operation 1402, where the device receives an encoded audio frame. For instance, the client receives the encoded frame from the encoder.

In an example, the flow includes operation 1404, where the device determines header from least significant bits (or some other particular bit location) of a first subset of encoded audio samples. For instance, metadata header is eight bits long. A decoder of the client extracts the least significant bits of the first eight encoded audio samples, and these bits form a bit pattern that corresponds to the header.

In an example, the flow includes operation 1406, where the device determines whether the header matches a known header of a metadata frame. For instance, the decoder compares the bit pattern to one or more known bit patterns. If a match is found, operation 1408 follows operation 1408. Otherwise, the flow proceeds to operation 1430 to then loop back to operation 1402.

In an example, the flow includes operation 1408, where the device determines a version type from least significant bits (or some other particular bit location) of a second subset of encoded audio samples. For instance, the version type of the metadata frame is eight bits long. The decoder extracts the least significant bits of the next eight encoded audio samples, and these bits form a bit pattern that corresponds to the version type.

In an example, the flow includes operation 1410, where the device verifies the version type. For instance, the decoder compares the bit pattern to one or more known bit patterns. If a match is found, the version type is verified and operation 1412 follows operation 1410. Otherwise, the flow proceeds to operation 1430 to then loop back to operation 1402.

In an example, the flow includes operation 1412, where the device determines a payload from least significant bits (or some other particular bit location) of a third subset of encoded samples. For instance, the version type indicates a length of the payload (e.g., nine bits or some other number bits) and the bit field structure of the payload (e.g., eight bits for echo return loss enhancement measurements and one bit for echo return loss enhancement flag). The decoder extracts the least significant bits of the next eight encoded audio samples, and these eight bits form a bit pattern that corresponds to the echo return loss enhancement measurements. The decoder also extracts the least significant bit of the next encoded audio sample, and this bit represents the echo return loss enhancement flag.

In an example, the flow includes operation 1414, where the device determines a checksum from least significant bits (or some other particular bit location) of a fourth subset of encoded audio samples. For instance, the checksum of the metadata frame is eight bits long. The decoder extracts the least significant bits of the next eight encoded audio samples, and these bits form a bit pattern that corresponds to the checksum.

In an example, the flow includes operation 1416, where the device determines if the extracted checksum matches a calculated checksum. For instance, the decoder uses the same hash function that the encoder used to generated the encoded checksum and this hash function is applied to one or more of the header, version type, and/or payload. The calculated checksum is compared to the extracted checksum and if the two match, operation 1418 and operation 1420 follow operation 1416. Otherwise, the flow proceeds to operation 1430 to then loop back to operation 1402.

In an example, the flow includes operation 1418, where the device determines one or more parameters from the payload. For instance, the extracted bits of the payload indicate audio properties (e.g., such as the echo return loss enhancement measurements and the echo return loss enhancement flag).

In an example, the flow includes operation 1420, where the device determines audio from remaining bits of the encoded samples. Here, the various metadata bits have been extracted from the encoded audio frame. The remaining bits of the encoded frame are extracted by the decoder as the audio bit.

In an example, the flow includes operation 1430, where the device determines that all the bits of the encoded audio frame are audio bits. At this operation, either the extracted header did not match a metadata header, the version type did not match a known version type, or the extracted checksum is invalid. If so, the decoder can determine that the encoded audio frame is indeed an audio frame, rather than a frame that also encodes metadata.

Figure 15:
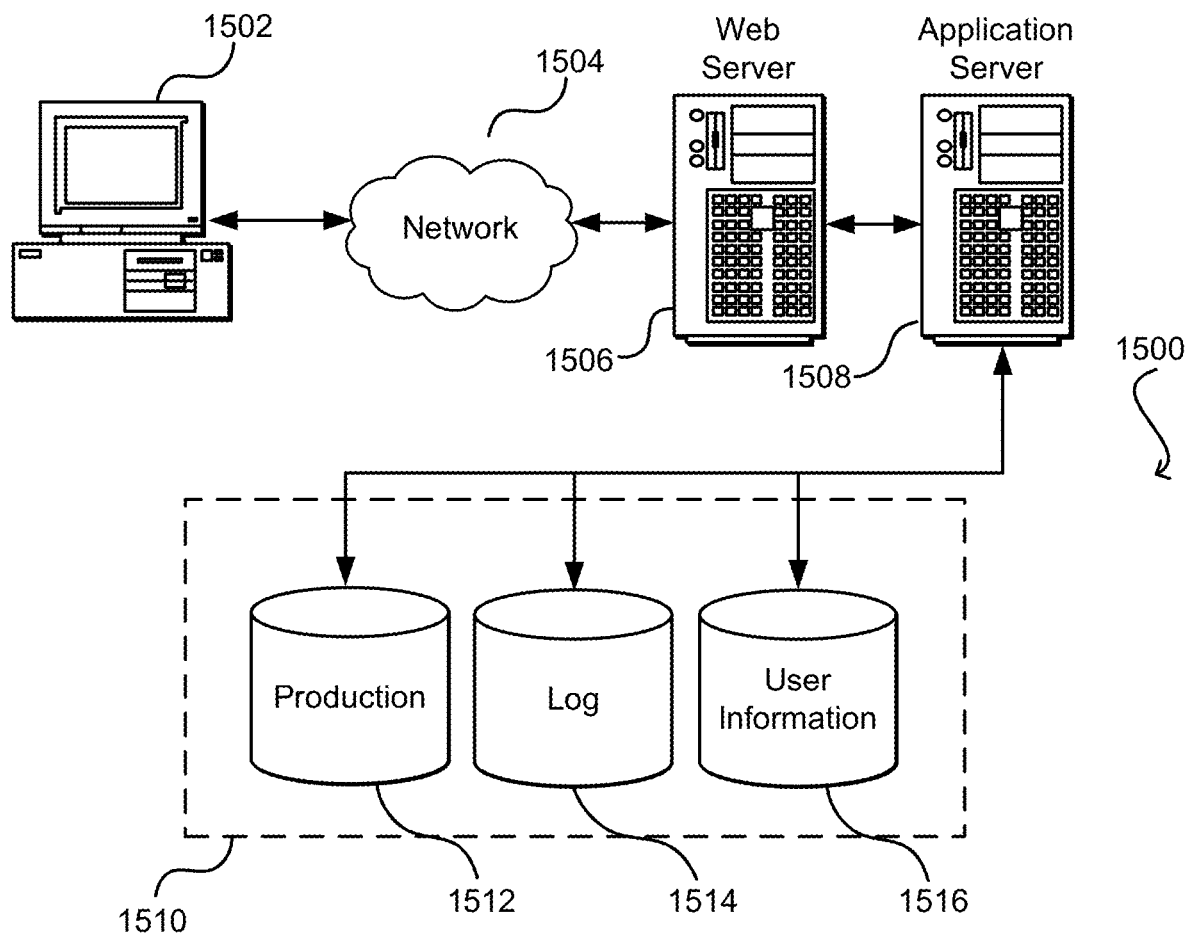
FIG. 15 illustrates an environment in which various embodiments can be implemented.

FIG. 15 illustrates aspects of an example environment 1500 for implementing aspects in accordance with various embodiments. As will be appreciated, although a Web-based environment is used for purposes of explanation, different environments may be used, as appropriate, to implement various embodiments. The environment includes an electronic client device 1502 (such as any of the multimedia devices described herein above), which can include any appropriate device operable to send and receive requests, messages, or information over an appropriate network 1504 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1506 for receiving requests and serving content in response thereto, although for other networks an alternative device serving a similar purpose could be used as would be apparent to one of ordinary skill in the art.

The illustrative environment includes at least one application server 1508 and a data store 1510. It should be understood that there can be several application servers, layers, or other elements, processes, components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1502 and the application server 1508, can be handled by the Web server. It should be understood that the Web and application servers are not required and are merely example components, as structured code discussed herein can be executed on any appropriate device or host machine as discussed elsewhere herein.

The data store 1510 can include several separate data tables, databases or other data storage mechanisms and media for storing data relating to a particular aspect. For example, the data store illustrated includes mechanisms for storing production data 1512 and user information 1516, which can be used to serve content for the production side. The data store also is shown to include a mechanism for storing log data 1514, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1510. The data store 1510 is operable, through logic associated therewith, to receive instructions from the application server 1508 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1502. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 15. Thus, the depiction of the system 1500 in FIG. 15 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method comprising:
   receiving encoded data including first audio data encoded with metadata, the first audio data representing a first portion of first audio, and the metadata indicating a property of the first audio;
   determining the metadata from the encoded data;
   determining the property of the first audio based at least in part on the metadata;
   generating decoded audio data that includes the first audio data and replaces the metadata with second audio data, the second audio data representing a second portion of the first audio, wherein the decoded audio data has a same size as the encoded data; and
   causing an output operation on the decoded audio data such that second audio is presented via a speaker based at least in part on the property.

2. The method of claim 1, wherein:
   receiving the encoded data comprises receiving an audio frame that includes audio bits and metadata bits, and
   determining the metadata comprises decoding the metadata bits based at least in part on first bit locations in the audio frame, and
   wherein the method further comprises decoding the audio bits based at least in part on second bit locations in the audio frame.

3. The method of claim 1, wherein:
   receiving the encoded data comprises receiving an encoded audio frame that includes a first encoded audio sample and a second encoded audio sample, the first encoded audio sample including a first plurality of audio bits and a first metadata bit, and the second encoded audio sample including a second plurality of audio bits and excluding any metadata, wherein the first plurality of audio bits corresponds to the first portion of the first audio, and wherein the second plurality of audio bits corresponds to the second portion of the first audio,
   determining the metadata comprises determining the first metadata bit from the first encoded audio sample, and
   generating the decoded audio data comprises generating a decoded audio frame that includes the first plurality of audio bits and the second plurality of audio bits and that excludes the first metadata bit.

4. The method of claim 1, wherein receiving the encoded data comprises receiving an audio frame and a metadata frame, wherein determining the metadata comprises determining a plurality of metadata bits from the metadata frame, and wherein generating the decoded audio data comprises determining a plurality of audio bits from the audio frame.

5. The method of claim 1, wherein determining the metadata comprises:
   determining a header of the metadata from a first portion of the encoded data;
   determining a match between the header and a known metadata header; and
   determining a remaining portion of the metadata from a second portion of the encoded data based at least in part on the match, the remaining portion indicating the property of the first audio.

6. The method of claim 5, wherein determining the metadata further comprises:
   determining a version type of the metadata from the second portion of the encoded data; and
   determining a payload of the metadata from the second portion of the encoded data based at least in part on the version type, wherein the payload indicates the property of the first audio.

7. The method of claim 5, wherein determining the metadata further comprises:
   determining a checksum of the metadata from the second portion of the encoded data;
   determining that the checksum is valid; and
   determining a payload of the metadata from the second portion of the encoded data based at least in part on the checksum being valid, wherein the payload indicates the property of the first audio.

8. A device, comprising:
   one or more processors; and one or memory storing computer-readable instructions that, upon execution by at least one of the one or more processors, configure the device to:

receive encoded data including first audio data encoded with metadata, the first audio data representing a first portion of first audio, and the metadata indicating a property of the first audio;

determine the metadata from the encoded data;

determine the property of the first audio based at least in part on the metadata;

generate decoded audio data that includes the first audio data and replaces the metadata with second audio data, the second audio data representing a second portion of the first audio, wherein the decoded audio data has a same size as the encoded data; and cause an output operation on the decoded audio data such that second audio is presented via a speaker based at least in part on the property.

9. The device of claim 8, wherein the encoded data comprises a first encoded audio sample that comprises audio bits at bit locations and a metadata bit at a bit location, and wherein the one or memory store additional computer-readable instructions that, upon execution by the one or more processors, configure the device to:

determine the audio bits from the first encoded audio sample; and generate an audio sample that includes the audio bits at the bit locations and an additional bit at the bit location, wherein the additional bit replaces the metadata bit with an audio bit from a second audio sample included in the encoded data.

10. The device of claim 8, wherein the first audio corresponds to a wake word of the device, wherein the property indicates that the first audio corresponds to a far end speech input, and wherein the output operation comprises suppressing the decoded audio data.

11. The device of claim 8, wherein the encoded data comprises an audio frame that comprises a plurality of audio samples, wherein an audio sample of the plurality of audio samples comprises a metadata bit and an audio bit.

12. The device of claim 8, wherein the encoded data comprises an encoded audio frame that comprises audio bits and metadata bits, wherein the audio bits are included from an audio frame and represent the first audio data, wherein the encoded audio frame and the audio frame have a same length.

13. The device of claim 8, wherein the one or memory store additional computer-readable instructions that, upon execution by the one or more processors, configure the device to:

determine a first portion of the metadata from a first portion of the encoded data, wherein the first portion of the metadata indicates a length or a structure of a second portion of the metadata; and determine, based at least in part on the first portion of the metadata, the second portion the metadata from a second portion of the encoded data, wherein the second portion of the metadata indicates the property of the first audio.

14. The device of claim 8, wherein the metadata comprises a metadata frame comprising a plurality of payload fields, wherein each one of the plurality of payload fields indicates a different property of the first audio and is associated with a different audio processing application.

15. A system comprising:
one or more processors; and
one or more memory storing computer-readable instructions that, upon execution by the one or more processors, configure the system to:

receive encoded data including first audio data encoded with metadata, the first audio data representing a first portion of first audio, and the metadata indicating a property of the first audio;

determine the metadata from the encoded data;

determine the property of the first audio based at least in part on the metadata;

generate decoded audio data that includes the first audio data and replaces the metadata with second audio data, the second audio data representing a second portion of the first audio, wherein the decoded audio data has a same size as the encoded data; and cause an output operation on the decoded audio data such that second audio is presented via a speaker based at least in part on the property.

16. The system of claim 15, wherein the one or more memory store additional computer-readable instructions that, upon execution by the one or more processors, configure the system to:

generate the encoded data by at least adding a portion of the metadata to a portion of the first audio data based at least in part on a size of the metadata and a size of the first audio data.

17. The system of claim 15, wherein the encoded data comprises a plurality of audio samples, and wherein the metadata comprises header data, and wherein the metadata is determined by at least:

determining the header data based at least in part on a first subset of the plurality of audio samples; and determining a remaining portion of the metadata based at least in part on a second subset of the plurality of audio samples, wherein the property of the first audio is indicated by the remaining portion of the metadata.

18. The system of claim 15, wherein the encoded data comprises a plurality of audio samples, and wherein the metadata comprises header data and version type data, and wherein the metadata is determined by at least:

determining the header data based at least in part on a first subset of the plurality of audio samples;

determining the version type data based at least in part on a second subset of the plurality of audio samples; and determining a remaining portion of the metadata based at least in part on a third subset of the plurality of audio samples, wherein the property of the first audio is indicated by the remaining portion of the metadata.

19. The system of claim 15, wherein the encoded data comprises a plurality of audio samples, and wherein the metadata comprises header data, version type data, and payload data, and wherein the metadata is determined by at least:

determining the header data from a first subset of the plurality of audio samples;

determining the version type data from a second subset of the plurality of audio samples, the version type data indicating a length or structure of the payload data; and determining, based at least in part on the version type data, the payload data from a third subset of the plurality of audio samples, wherein the property of the first audio is indicated by the payload data.

20. The system of claim 15, wherein the property indicates at least one of a signal-to-noise ratio, a timestamp, or a presence of sound, and wherein the output operation comprises at least one of audio suppression, audio processing latency determination, or sound detection.

* * * * *

UNITED STATES PATENT AND TRADEMARK OFFICE
CERTIFICATE OF CORRECTION

PATENT NO. : 11,942,100 B1  
APPLICATION NO. : 17/713084  
DATED : March 26, 2024  
INVENTOR(S) : Aditya Sharadchandra Joshi, Carlo Murgia and Michael Thomas Peterson Page 1 of 1

It is certified that error appears in the above-identified patent and that said Letters Patent is hereby corrected as shown below:

In the Claims

Claim 8 – Column 25 Line 1:  
Delete: "one or memory"  
Add: --one or more memory--

Claim 9 – Column 25 Line 23:  
Delete: "one or memory"  
Add: --one or more memory--

Claim 13 – Column 25 Line 48:  
Delete: "one or memory"  
Add: --one or more memory--

Claim 13 – Column 25 Line 57:  
Delete: "the second portion the metadata"  
Add: --the second portion of the metadata--

Signed and Sealed this  
Fifteenth Day of July, 2025

Coke Morgan Stewart  
*Acting Director of the United States Patent and Trademark Office*